(12) United States Patent
Peppas et al.

(10) Patent No.: US 12,206,234 B2
(45) Date of Patent: Jan. 21, 2025

(54) OVERVOLTAGE PROTECTION DEVICE MODULES

(71) Applicant: RIPD IP DEVELOPMENT LTD, Nicosia (CY)

(72) Inventors: George Peppas, Kalloni Troizinias (GR); Alexis Chorozoglou, Drama (GR); Panagiotis Raptis, Drama (GR); Elias Fermelis, Koropi (GR)

(73) Assignee: RIPD IP DEVELOPMENT LTD, Nicosia (CY)

( * ) Notice: Subject to any disclaimer, the term of this patent is extended or adjusted under 35 U.S.C. 154(b) by 305 days.

(21) Appl. No.: 17/933,757

(22) Filed: Sep. 20, 2022

(65) Prior Publication Data

US 2024/0097430 A1   Mar. 21, 2024

(51) Int. Cl.
| | |
|---|---|
| *H02H 3/00* | (2006.01) |
| *H01C 7/12* | (2006.01) |
| *H01C 7/18* | (2006.01) |
| *H02H 3/02* | (2006.01) |
| *H02H 3/20* | (2006.01) |

(52) U.S. Cl.
CPC ............... *H02H 3/20* (2013.01); *H01C 7/12* (2013.01); *H01C 7/18* (2013.01); *H02H 3/023* (2013.01)

(58) Field of Classification Search
None
See application file for complete search history.

(56) References Cited

U.S. PATENT DOCUMENTS

| | | | |
|---|---|---|---|
| 1,144,029 | A | 6/1915 | Creighton |
| 2,158,859 | A | 5/1939 | Shinichiro |
| 2,311,758 | A | 2/1943 | Johansson |
| 2,805,294 | A | 9/1957 | Harold |
| 2,971,132 | A | 2/1961 | Nash |
| 3,249,719 | A | 5/1966 | Misare et al. |
| 3,375,405 | A | 3/1968 | Chiffee et al. |
| 3,522,570 | A | 8/1970 | Wanaselja |
| 3,711,794 | A | 1/1973 | Tasca et al. |

(Continued)

FOREIGN PATENT DOCUMENTS

| | | |
|---|---|---|
| CA | 2098365 A1 | 12/1993 |
| CH | 466427 A | 12/1968 |

(Continued)

OTHER PUBLICATIONS

Extended European Search Report corresponding to European Patent Application No. 23193071.0 (12 pages) (dated Jul. 2, 2024).

(Continued)

*Primary Examiner* — Stephen W Jackson
(74) *Attorney, Agent, or Firm* — Myers Bigel, P.A.

(57) ABSTRACT

An overvoltage protection device module includes an electrically conductive first electrode, an electrically conductive housing electrode, and a varistor member formed of a varistor material and electrically connected between the first electrode and the housing electrode. The housing electrode includes a housing end wall and a housing side wall collectively defining a housing cavity, and first and second housing members joined together at a joint. The first housing member forms a first portion of the housing side wall and the second housing member forms a second portion of the housing side wall. The varistor member is disposed in the housing cavity.

28 Claims, 16 Drawing Sheets

(56) References Cited

U.S. PATENT DOCUMENTS

| | | |
|---|---|---|
| 3,743,996 A | 7/1973 | Harnden |
| 3,813,577 A | 5/1974 | Kawiecke |
| 3,863,111 A | 1/1975 | Martzloff |
| 4,015,228 A | 3/1977 | Eda et al. |
| 4,023,133 A | 5/1977 | Knapp |
| 4,085,397 A | 4/1978 | Yagher, Jr. |
| 4,092,694 A | 5/1978 | Stetson |
| 4,217,618 A | 8/1980 | Kellenbenz et al. |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |
| 4,355,345 A | 10/1982 | Franchet |
| 4,425,017 A | 1/1984 | Chan |
| 4,493,003 A | 1/1985 | Mickelson et al. |
| 4,571,656 A | 2/1986 | Ruckman |
| 4,595,635 A | 6/1986 | Dubrow et al. |
| 4,600,261 A | 7/1986 | Debbaut |
| 4,638,284 A | 1/1987 | Levinson |
| 4,677,518 A | 6/1987 | Hershfield |
| 4,701,574 A | 10/1987 | Shimirak et al. |
| 4,906,963 A | 3/1990 | Ackermann et al. |
| 4,908,730 A | 3/1990 | Westrom |
| 4,956,696 A | 9/1990 | Hoppe et al. |
| 5,006,950 A | 4/1991 | Allina |
| 5,130,884 A | 7/1992 | Allina |
| 5,151,054 A * | 9/1992 | Briones .............. H01R 13/6582 439/620.13 |
| 5,172,296 A | 12/1992 | Kaczmarek |
| 5,311,164 A | 5/1994 | Ikeda et al. |
| 5,436,786 A | 7/1995 | Pelly et al. |
| 5,519,564 A | 5/1996 | Carpenter |
| 5,523,916 A | 6/1996 | Kaczmarek |
| 5,529,508 A | 6/1996 | Chiotis et al. |
| 5,588,856 A | 12/1996 | Collins et al. |
| 5,608,596 A | 3/1997 | Smith et al. |
| 5,621,599 A | 4/1997 | Larsen et al. |
| 5,652,690 A | 7/1997 | Mansfield et al. |
| 5,721,664 A | 2/1998 | Uken et al. |
| 5,724,221 A | 3/1998 | Law |
| 5,745,322 A | 4/1998 | Duffy et al. |
| 5,781,394 A | 7/1998 | Lorenz et al. |
| 5,808,850 A | 9/1998 | Carpenter |
| 5,812,047 A | 9/1998 | Van |
| 5,936,824 A | 8/1999 | Carpenter |
| 5,982,597 A | 11/1999 | Webb |
| 5,990,778 A | 11/1999 | Struempler et al. |
| 6,038,119 A | 3/2000 | Atkins et al. |
| 6,094,128 A | 7/2000 | Bennett et al. |
| 6,172,865 B1 | 1/2001 | Boy et al. |
| 6,175,480 B1 | 1/2001 | Karmazyn |
| 6,222,433 B1 | 4/2001 | Ramakrishnan et al. |
| 6,226,162 B1 | 5/2001 | Kladar et al. |
| 6,226,166 B1 | 5/2001 | Gumley et al. |
| 6,430,019 B1 | 8/2002 | Martenson et al. |
| 6,430,020 B1 * | 8/2002 | Atkins .................... H01C 7/12 361/127 |
| 6,459,559 B1 | 10/2002 | Christofersen |
| 6,556,402 B2 | 4/2003 | Kizis et al. |
| 6,614,640 B2 | 9/2003 | Richter et al. |
| 6,930,871 B2 | 8/2005 | Macanda |
| 7,433,169 B2 | 10/2008 | Kamel et al. |
| 7,558,041 B2 | 7/2009 | Lagnoux |
| 7,684,166 B2 | 3/2010 | Donati et al. |
| 7,738,231 B2 | 6/2010 | Lagnoux |
| 8,493,170 B2 | 7/2013 | Zaeuner et al. |
| 8,659,866 B2 | 2/2014 | Douglass et al. |
| 8,699,197 B2 | 4/2014 | Douglass et al. |
| 8,743,525 B2 | 6/2014 | Kepapas et al. |
| 8,766,762 B2 | 7/2014 | Depping et al. |
| 8,929,042 B2 | 1/2015 | Pfitzer et al. |
| 9,349,548 B2 | 5/2016 | Juricev |
| 9,355,763 B2 | 5/2016 | Xu |
| 9,570,260 B2 | 2/2017 | Yang et al. |
| 9,634,554 B2 | 4/2017 | Falk et al. |
| 9,750,122 B1 | 8/2017 | Elizondo-Decanini |
| 9,906,017 B2 | 2/2018 | Tsovilis et al. |
| 10,050,436 B2 | 8/2018 | Buchanan |
| 10,447,026 B2 | 10/2019 | Kostakis et al. |
| 10,707,678 B2 | 7/2020 | Tavcar et al. |
| 11,527,879 B2 | 12/2022 | Politis et al. |
| 11,723,145 B2 | 8/2023 | žnideri et al. |
| 11,862,967 B2 * | 1/2024 | Peppas .................. H02H 9/042 |
| 2002/0018331 A1 | 2/2002 | Takahashi |
| 2002/0024792 A1 | 2/2002 | Cantagrel |
| 2002/0159212 A1 | 10/2002 | Oughton |
| 2003/0184926 A1 | 10/2003 | Wu et al. |
| 2004/0150937 A1 | 8/2004 | Bobert et al. |
| 2004/0257742 A1 | 12/2004 | Zeller et al. |
| 2005/0185356 A1 | 8/2005 | Durth |
| 2005/0231872 A1 | 10/2005 | Schimanski et al. |
| 2006/0034031 A1 | 2/2006 | Lehuede |
| 2006/0245125 A1 | 11/2006 | Aszmus |
| 2006/0291127 A1 | 12/2006 | Kim et al. |
| 2007/0217106 A1 | 9/2007 | Lagnoux |
| 2008/0043395 A1 | 2/2008 | Donati et al. |
| 2008/0049370 A1 | 2/2008 | Adachi et al. |
| 2009/0302992 A1 | 12/2009 | Cernicka |
| 2011/0013330 A1 | 1/2011 | Crevenat et al. |
| 2011/0193674 A1 | 8/2011 | Zaeuner et al. |
| 2011/0248816 A1 | 10/2011 | Duval et al. |
| 2012/0050935 A1 | 3/2012 | Douglass et al. |
| 2012/0086539 A1 | 4/2012 | Duval et al. |
| 2012/0086540 A1 | 4/2012 | Duval et al. |
| 2012/0206848 A1 | 8/2012 | Gillespie et al. |
| 2012/0250205 A1 | 10/2012 | Pfitzer et al. |
| 2012/0268850 A1 | 10/2012 | Rainer et al. |
| 2013/0038976 A1 | 2/2013 | Hagerty |
| 2013/0200986 A1 | 8/2013 | Koprivsek |
| 2013/0208387 A1 | 8/2013 | Nguyen |
| 2013/0265685 A1 | 10/2013 | Zauner et al. |
| 2013/0335869 A1 | 12/2013 | Kepapas et al. |
| 2014/0010704 A1 | 1/2014 | Ishida et al. |
| 2014/0092514 A1 | 4/2014 | Chen |
| 2014/0292472 A1 | 10/2014 | Qin et al. |
| 2014/0327990 A1 | 11/2014 | Juricev |
| 2015/0014538 A1 | 1/2015 | Holliday |
| 2015/0103462 A1 | 4/2015 | Depping |
| 2015/0107972 A1 | 4/2015 | Oh |
| 2015/0108899 A1 | 4/2015 | Ramabhadran et al. |
| 2015/0270086 A1 | 9/2015 | Chen |
| 2015/0280420 A1 | 10/2015 | Mao |
| 2015/0349523 A1 | 12/2015 | Tsovilis et al. |
| 2016/0087520 A1 | 3/2016 | Falk et al. |
| 2016/0276821 A1 | 9/2016 | Politis et al. |
| 2016/0329701 A1 | 11/2016 | Bandel |
| 2017/0311462 A1 | 10/2017 | Kamensek et al. |
| 2018/0138697 A1 | 5/2018 | Crevenat et al. |
| 2018/0138698 A1 | 5/2018 | Tsovilis et al. |
| 2018/0151318 A1 | 5/2018 | Kamensek et al. |
| 2018/0183230 A1 | 6/2018 | Kostakis et al. |
| 2018/0183232 A1 * | 6/2018 | Tavcar .................. H02H 9/044 |
| 2018/0330908 A1 | 11/2018 | Vrhunc et al. |
| 2018/0341024 A1 | 11/2018 | Shetty et al. |
| 2019/0080826 A1 | 3/2019 | Kamensek et al. |
| 2019/0099132 A1 | 4/2019 | Mulinti et al. |
| 2020/0035386 A1 | 1/2020 | Hsu |
| 2020/0036185 A1 | 1/2020 | Tsovilis et al. |

FOREIGN PATENT DOCUMENTS

| | | |
|---|---|---|
| CN | 106026067 A | 10/2016 |
| DE | 1018953 B | 11/1957 |
| DE | 3111096 A1 | 9/1982 |
| DE | 3428258 A1 | 2/1986 |
| DE | 4235329 A1 | 4/1994 |
| DE | 69201021 T2 | 2/1995 |
| DE | 4438593 A1 | 5/1996 |
| DE | 19823446 A1 | 11/1999 |
| DE | 19839422 A1 | 3/2000 |
| DE | 19843519 A1 | 4/2000 |
| DE | 202004006227 U1 | 9/2004 |
| DE | 10323220 A1 | 12/2004 |
| DE | 102005048003 A1 | 4/2007 |

(56) References Cited

FOREIGN PATENT DOCUMENTS

| | | |
|---|---|---|
| DE | 102006003274 A1 | 7/2007 |
| DE | 202008004699 U1 | 6/2008 |
| DE | 102007014336 A1 | 10/2008 |
| DE | 102007030653 A1 | 2/2009 |
| DE | 102008017423 A1 | 10/2009 |
| DE | 102008026555 A1 | 12/2009 |
| DE | 102009004704 A1 | 3/2010 |
| DE | 102012004678 A1 | 9/2013 |
| DE | 202006021210 U1 | 9/2013 |
| DE | 102013103753 A1 | 10/2013 |
| DE | 102013011216 B3 | 10/2014 |
| DE | 102013107807 B3 | 1/2015 |
| DE | 102013021936 B3 | 2/2015 |
| DE | 102014016938 B3 | 2/2016 |
| DE | 102014016830 A1 | 3/2016 |
| EP | 0108518 A2 | 5/1984 |
| EP | 0203737 A2 | 12/1986 |
| EP | 0335479 A2 | 10/1989 |
| EP | 0445054 A1 | 9/1991 |
| EP | 0462694 A2 | 12/1991 |
| EP | 0516416 A1 | 12/1992 |
| EP | 0603428 A1 | 6/1994 |
| EP | 0785625 A2 | 7/1997 |
| EP | 0963590 A1 | 12/1999 |
| EP | 1094550 A2 | 4/2001 |
| EP | 1102371 A1 | 5/2001 |
| EP | 1116246 A1 | 7/2001 |
| EP | 1148530 A1 | 10/2001 |
| EP | 1355327 A2 | 10/2003 |
| EP | 1458072 A1 | 9/2004 |
| EP | 1261977 B1 | 8/2005 |
| EP | 1798742 A1 | 6/2007 |
| EP | 1855365 A1 | 11/2007 |
| EP | 2075811 A2 | 7/2009 |
| EP | 2201654 A1 | 6/2010 |
| EP | 2419976 A2 | 2/2012 |
| EP | 2707892 A1 | 3/2014 |
| EP | 2725588 A1 | 4/2014 |
| EP | 2953142 A1 | 12/2015 |
| EP | 2954538 A1 | 12/2015 |
| EP | 3001525 A1 | 3/2016 |
| EP | 3240132 A1 | 11/2017 |
| EP | 3460938 A1 | 3/2019 |
| EP | 3989379 A1 | 4/2022 |
| FR | 2574589 A1 | 6/1986 |
| FR | 2622047 A1 | 4/1989 |
| FR | 2897231 A1 | 8/2007 |
| JP | S60187002 A | 9/1985 |
| JP | S60226103 A | 11/1985 |
| JP | S60258905 A | 12/1985 |
| JP | S61198701 A | 9/1986 |
| JP | H01176687 A | 7/1989 |
| JP | H05176445 A | 7/1993 |
| JP | H09326546 A | 12/1997 |
| JP | 2002525861 A | 8/2002 |
| JP | 2002525862 A | 8/2002 |
| JP | 2005294459 A | 10/2005 |
| JP | 2012204473 A | 10/2012 |
| JP | 5493065 B2 | 3/2014 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 A | 8/2011 |
| SI | 23749 A | 11/2012 |
| SI | 24371 A | 11/2014 |
| WO | 8800603 A2 | 1/1988 |
| WO | 9005401 A1 | 5/1990 |
| WO | 9515600 A1 | 6/1995 |
| WO | 9524756 A1 | 9/1995 |
| WO | 9742693 A1 | 11/1997 |
| WO | 9838653 A1 | 9/1998 |
| WO | 0017892 A1 | 3/2000 |
| WO | 2007117163 A1 | 10/2007 |
| WO | 2008009507 A1 | 1/2008 |
| WO | 2008104824 A1 | 9/2008 |
| WO | 2010120834 A2 | 10/2010 |
| WO | 2011102811 A2 | 8/2011 |
| WO | 2012026888 A1 | 3/2012 |
| WO | 2012154134 A1 | 11/2012 |
| WO | 2013044961 A1 | 4/2013 |
| WO | 2016101776 A1 | 6/2016 |
| WO | 2016110360 A1 | 7/2016 |

OTHER PUBLICATIONS

Beitz et al. "Chapter 1: Mechanical Design Elements—Component Connections" in Dubbel Taschenbuch für den Maschinenbau (3 pages) (1997).

Data Book Library 1997 Passive Components, Siemens Matsushita Components (pp. 15-17, 26-32, 36-37, 39, 161, 166, 167, 169, 171-174) (1997).

DuPont 4300 Series Resistors Technical Data Sheet (3 pages) (May 2013).

FormexTM GK/Formex Product Data Flame Retardant Polypropylene Sheet, ITW Formex (4 pages) (2002).

Oberg et al. "Machinery's Handbook 27th Edition—Soldering and Brazing" (4 pages) (2004).

Raycap "RayvossTM Transient Voltage Surge Suppression System" webpage <http://www.raycap.com/surge/rayvoss.htm> (1 page) (undated, accessed on Nov. 29, 2005) (Date Unknown; Admitted Prior Art).

Translation of DIN-Standards, Built-In Equipment for Electrical Installations; Overall Dimensions and Related Mounting Dimensions (15 pages) (Dec. 1988).

VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).

"RayvossTM "Applications" webpage http://www.rayvoss.com/applications.htm accessed on Nov. 29, 2005 (4 pages) (undated)".

Raycap "Revolutionary Lightning Protection Technology", Raycap Corporation Press Release, webpage, http://www.raycap.com/news/020930.htm accessed on Nov. 29, 2005 (Date Unknown; Admitted Prior Art), (1 page).

Raycap "Strikesorb® 30 Series OEM Surge Suppression Solutions", brochure, Apr. 17, 2009, (2 pages).

Raycap "The Next Generation Surge Protection Rayvoss™", brochure, May 4, 2012, (4 pages).

Raycap "The Ultimate Overvoltage Protection Rayvoss™", brochure, 2005, (4 pages).

Raycap "The Ultimate Overvoltage Protection Rayvoss™", brochure, Jan. 2009, (4 pages).

Raycap "The Ultimate Overvoltage Protection: RayvossTM", brochure (Date Unknown; Admitted Prior Art), (4 pages).

Rayvoss "Frequently Asked Questions", webpage, http://www.rayvoss.com/faq.htm accessed on Nov. 29, 2005 (Date Unknown; Admitted Prior Art), (2 pages).

Rayvoss "Technical Information", webpage, http://www.rayvoss.com/tech_info.htm accessed on Nov. 29, 2005 (Date Unknown; Admitted Prior Art), (3 pages).

Rayvoss "The Ultimate Overvoltage Protection", webpage, http://www.rayvoss.com accessed on Nov. 29, 2005 (Date Unknown; Admitted Prior Art), (2 pages).

Partial European Search Report corresponding to European Patent Application No. 23193071.0 (13 pages) (dated Apr. 11, 2024).

\* cited by examiner

OVERVOLTAGE PROTECTION DEVICE MODULES

FIELD OF THE INVENTION

The present invention relates to overvoltage protection devices and, more particularly, to overvoltage protection devices including varistors.

BACKGROUND OF THE INVENTION

Many applications generate temporary overvoltages with high energy during switching operations or faults in the power network. These excessive energies must be absorbed with a device without creating high residual voltages on the equipment or load.

To meet above requirements, one or more metal oxide varistors (i.e, voltage dependent resistors) are used to absorb the electric energy during transient events and to keep the voltage to desired low values. The varistor has a characteristic clamping voltage such that, responsive to a voltage increase beyond a prescribed voltage, the varistor forms a low resistance shunt path for the overvoltage current that reduces the potential for damage to the sensitive equipment.

Varistors have been constructed according to several designs for different applications. For heavy-duty applications (e.g., surge current capability in the range of from about 60 to 100 kA) such as protection of telecommunications facilities, block varistors are commonly employed. A block varistor typically includes a disk-shaped varistor element potted in a plastic housing. The varistor disk is formed by pressure casting a metal oxide material, such as zinc oxide, or other suitable material such as silicon carbide. Copper or other electrically conductive material is flame sprayed onto the opposed surfaces of the disk. Ring-shaped electrodes are bonded to the coated opposed surfaces, and the disk and electrode assembly is enclosed within the plastic housing. Examples of such block varistors include product No. SIOV-B86OK250 available from Siemens Matsushita Components GmbH & Co. KG and Product No. V271 BA60 available from Harris Corporation.

Another varistor design includes a high-energy varistor disk housed in a disk diode case. The diode case has opposed electrode plates and the varistor disk is positioned therebetween. One or both of the electrodes include a spring member disposed between the electrode plate and the varistor disk to hold the varistor disk in place. The spring member or members provide only a relatively small area of contact with the varistor disk.

The varistor constructions described above often perform inadequately in service. Often, the varistors overheat and catch fire. Overheating may cause the electrodes to separate from the varistor disk, causing arcing and further fire hazard. There may be a tendency for pinholing of the varistor disk to occur, in turn causing the varistor to perform outside of its specified range. During high current impulses, varistor disks of the prior art may crack due to piezoelectric effect, thereby degrading performance. Failure of such varistors has led to new governmental regulations for minimum performance specifications. Manufacturers of varistors have found these new regulations difficult to meet.

SUMMARY

According to some embodiments, an overvoltage protection device module includes an electrically conductive first electrode, an electrically conductive housing electrode, and a varistor member formed of a varistor material and electrically connected between the first electrode and the housing electrode. The housing electrode includes a housing end wall and a housing side wall collectively defining a housing cavity, and first and second housing members joined together at a joint. The first housing member forms a first portion of the housing side wall and the second housing member forms a second portion of the housing side wall. The varistor member is disposed in the housing cavity.

In some embodiments, the overvoltage protection device module has a module axis, the first electrode, the varistor member and the end wall are axially stacked along the module axis, and the first housing member and the second housing member are axially stacked along the module axis.

According to some embodiments, the first housing member is a base housing member including the end wall and an integral base side wall, and the base housing member defines a base cavity forming a part of the housing cavity.

In some embodiments, the varistor member is disposed in the base cavity.

In some embodiments, the second housing member is an extension housing member defining a passage, and the passage forms a part of the housing cavity.

In some embodiments, the base housing member is unitarily formed of metal, and the extension housing member is unitarily formed of metal.

According to some embodiments, the first housing member includes a first screw thread, the second housing member includes a second screw thread, and the first and second housing members are joined together at the joint by the first and second screw threads.

According to some embodiments, the overvoltage protection device module includes an annular sealing member interposed between the first and second housing members to seal the joint.

According to some embodiments, the first housing member includes a first contact surface, the second housing member includes a second contact surface, and the first and second contact surfaces engage one another at the joint to provide electrical continuity between the first and second housing members.

In some embodiments, the first electrode is disposed in the housing cavity.

According to some embodiments, the overvoltage protection device module has a module axis, the overvoltage protection device module includes a varistor stack including a stack of varistor members formed of a varistor material, the varistor stack is electrically connected between the first electrode and the housing electrode, the varistor stack is disposed in the housing cavity between the first electrode and the end wall, and the first electrode, the varistor stack and the end wall are axially stacked along the module axis.

According to some embodiments, the overvoltage protection device module includes at least one electrically conductive interconnect member connecting at least two of the varistor members in electrical parallel between the first electrode and the housing electrode.

In some embodiments, the overvoltage protection device module includes an insulator member surrounding at least a portion of the varistor stack, the insulator member is formed of an electrically insulating material, the insulator member includes a receiver recess, and a portion of the interconnect member extends outwardly beyond the plurality of varistors and is disposed in the receiver recess.

According to some embodiments, the overvoltage protection device module has a module axis, the overvoltage protection device module includes an insulator stack assembly comprising a plurality of tubular insulator members that are axially stacked along the module axis, the insulator stack assembly is disposed in the housing cavity, the insulator stack assembly surrounds the varistor member between the varistor member and the housing electrode, and the insulator members are formed of an electrically insulating material.

In some embodiments, the insulator stack assembly includes at least one gasket axially interposed between adjacent ones of the insulator members.

In some embodiments, the insulator members are formed of ceramic.

According to some embodiments, the overvoltage protection device module includes a loading device applying an axially compressive load to the varistor member.

In some embodiments, the loading device includes an elastomeric compression member electrically insulating the first electrode from the housing electrode and biasing the first electrode and the housing electrode to apply a compressive load on the varistor member.

According to some embodiments, the overvoltage protection device module includes an integral fail-safe mechanism operative to electrically short circuit the first electrode and the housing electrode about the varistor member by fusing first and second metal surfaces in the overvoltage protection device module to one another using an electric arc.

In some embodiments, the housing electrode includes a flange that projects radially inward from the housing side wall, the first metal surface is a surface of the first electrode, and the second metal surface is a surface of the flange.

In some embodiments, the overvoltage protection device module includes an integral second fail-safe mechanism including an electrically conductive, meltable member. The meltable member is responsive to heat in the overvoltage protection device module to melt and form a short circuit current flow path through the meltable member, between the first electrode and the housing electrode and bypassing the varistor member.

According to some embodiments, the overvoltage protection device module includes an integral fail-safe mechanism including an electrically conductive, meltable member. The meltable member is responsive to heat in the overvoltage protection device module to melt and form a short circuit current flow path through the meltable member, between the first electrode and the housing electrode and bypassing the varistor member.

In some embodiments, the overvoltage protection device module includes an electrically insulating, elastomeric insulating cover sleeve surrounding the first and second housing members.

According to some embodiments, an overvoltage protection device module has a module axis and includes an electrically conductive first electrode, an electrically conductive housing electrode, a varistor member, and an insulator stack assembly. The housing electrode defines a housing cavity. The varistor member is formed of a varistor material and is electrically connected between the first electrode and the housing electrode. The insulator stack assembly includes a plurality of tubular insulator members that are axially stacked along the module axis. The varistor member is disposed in the housing cavity. The insulator stack assembly is disposed in the housing cavity. The insulator stack assembly surrounds the varistor member between the varistor member and the housing electrode. The insulator members are formed of an electrically insulating material.

In some embodiments, wherein the insulator stack assembly includes at least one gasket axially interposed between adjacent ones of the insulator members.

In some embodiments, the at least one gasket is/are formed of an elastomeric material.

In some embodiments, the insulator members are formed of ceramic.

According to some embodiments, an overvoltage protection device module has a module axis and includes an electrically conductive first electrode, an electrically conductive housing electrode, and a varistor member. The housing electrode defines a housing cavity. The varistor member is formed of a varistor material and is electrically connected between the first electrode and the housing electrode. The housing electrode includes a side wall, and a flange that projects radially inward from the housing side wall. The overvoltage protection device module includes an integral fail-safe mechanism operative to electrically short circuit the first electrode and the housing electrode about the varistor member by fusing a surface of the first electrode to a surface of the flange using an electric arc.

According to some embodiments, an overvoltage protection device module has a module axis and includes an electrically conductive first electrode, an electrically conductive housing electrode, a varistor member, and an electrically insulating elastomeric cover insulating cover sleeve. The housing electrode defines a housing cavity. The varistor member is formed of a varistor material and is electrically connected between the first electrode and the housing electrode. The insulating elastomeric cover insulating cover sleeve surrounds the first and second housing members

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
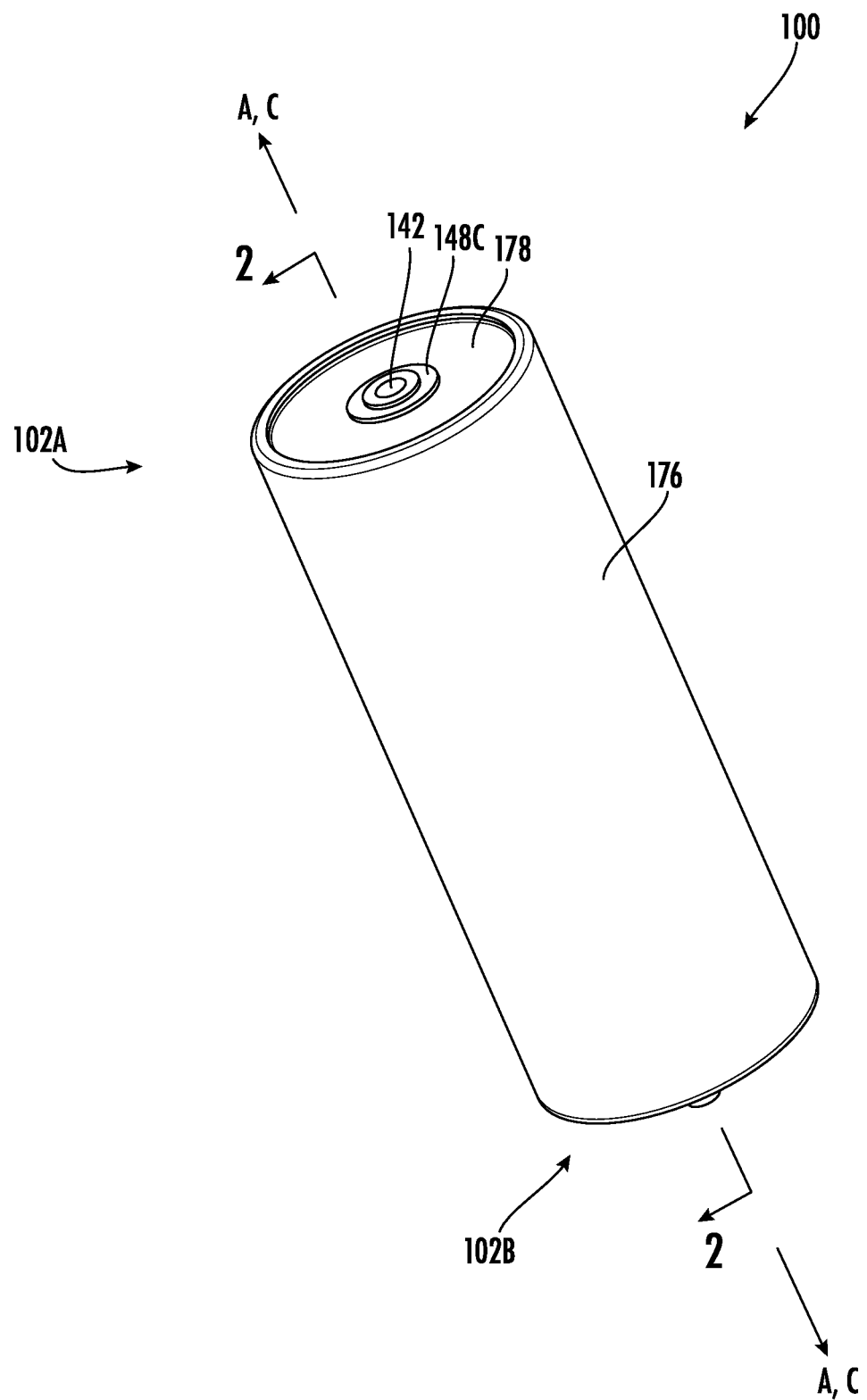
FIG. 1 is a top perspective view of an OVPD module according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams. Alternatively, a unitary object can be a composition composed of multiple parts or components secured together at joints or seams.

As used herein, the term "wafer" means a substrate having a thickness which is relatively small compared to its diameter, length or width dimensions.

With reference to FIGS. 1-16, a modular electric energy absorber, surge protective device (SPD) or overvoltage protection device (OVPD) according to embodiments of the present invention is shown therein and designated 100.

OVPD modules 100 as disclosed herein include varistors 150 and may be used for providing protection against transient overvoltages, temporary overvoltages and surge/lightning current may. For example, in response to transient overvoltages and surge currents, the varistors 150 may be in a conducting mode for a very limited period of time (e.g., in the range of from 20 microseconds to 1 millisecond) for a current in the range of from 1 kA and 60 kA; and, in response to temporary overvoltages, the varistors 150 may be in a conducting mode for a longer period of time (e.g., in the range of 1 millisecond to 120 seconds) for a current in the range of from 100 A and 30 kA. Therefore, when the OVPD module 100 is used for the protection against temporary overvoltages the varistors 150 may conduct a significant current from the power source in an effort to clamp the overvoltage that is generated by the power source. As such, they may be required to absorb significant amounts of energy for a long duration. Additionally, when such varistors fail, the failure mode may be a low impedance (i.e, short circuit) failure mode at the end of the device life.

In accordance with some embodiments, the OVPD module 100 is used as an overvoltage protection device or energy absorber in an electrical circuit as discussed above. In accordance with some embodiments, the OVPD module 100 is used as an overvoltage protection device or energy absorber in a direct current (DC) electrical circuit.

The OVPD module 100 is configured as a unit or module having a lengthwise axis A-A (FIG. 1). The OVPD module 100 has a first end 102A and an opposing second end 102B. The ends 102A and 102B and other feature are referred to herein as "top", "bottom", "upper" or "lower" only for the purpose of explanation. It will be appreciated that the OVPD module 100 can assume any orientation and therefore these features are not limited to any such top/bottom or upper/lower relationship.

Figure 2:
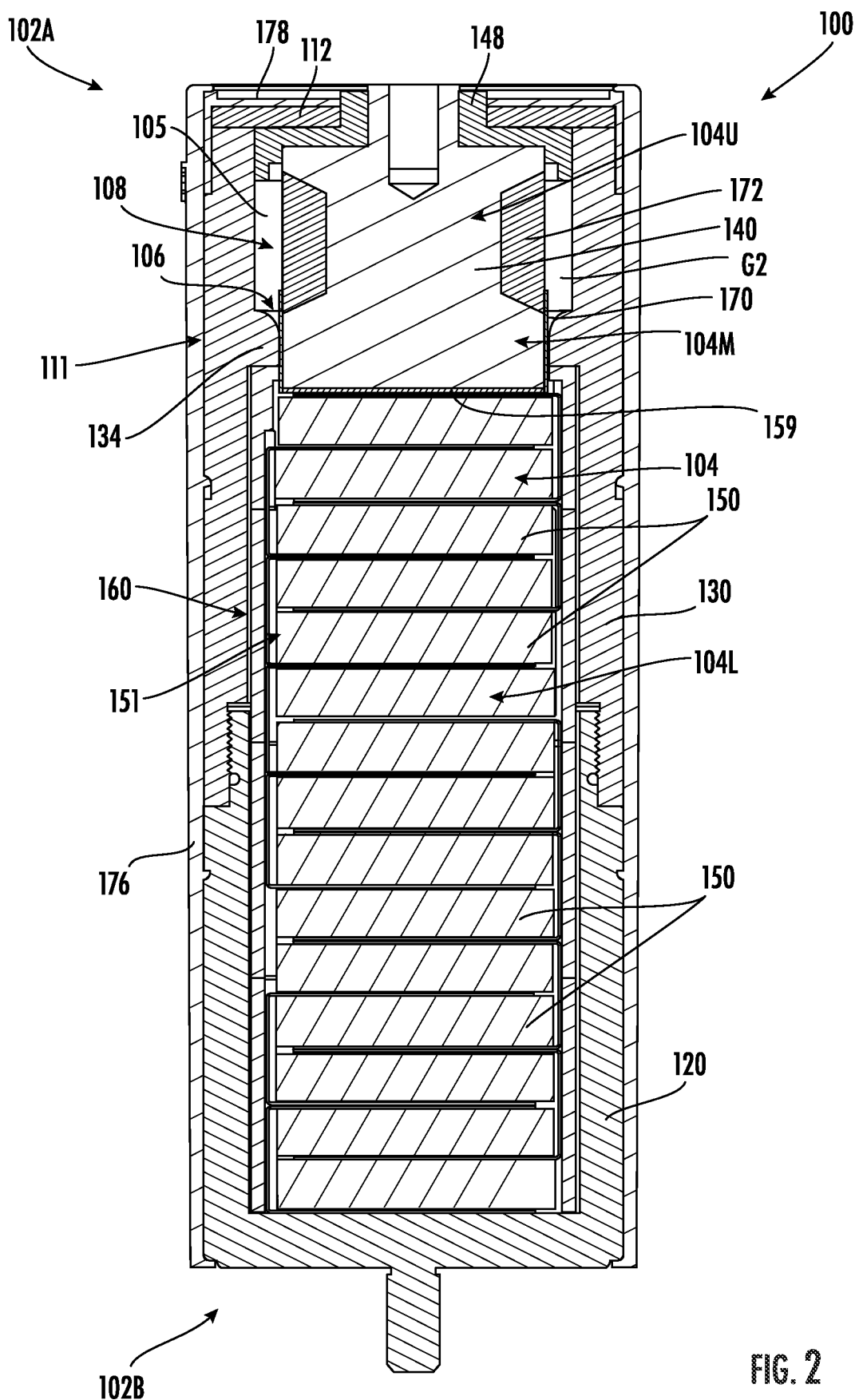
FIG. 2 is a cross-sectional view of the OVPD module of FIG. 1 taken along the line 2-2 of FIG. 1.
Figure 3:
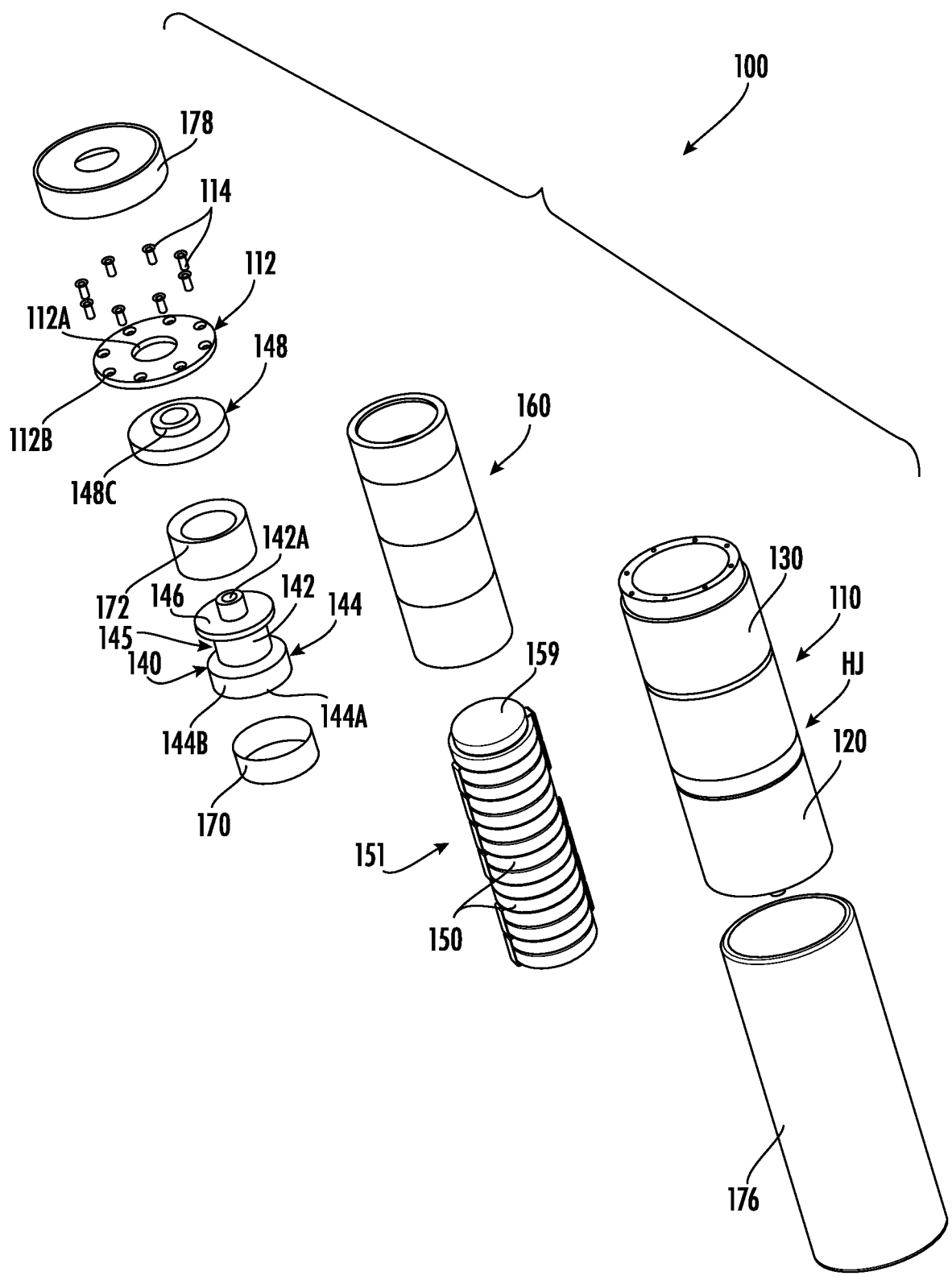
FIG. 3 is an exploded, top perspective view of the OVPD module of FIG. 1.

With reference to FIG. 2, the OVPD module 100 includes a housing assembly 111, a varistor stack 151, an electrical insulator stack assembly 160, an electrical insulator membrane 170, an insulation cover 176, an insulation cap 178, a first fail-safe mechanism 106 (which uses arc fusing), and a second fail-safe mechanism 108 (including a meltable member 172).

The module housing assembly 111 includes and is collectively formed by a lower housing assembly or housing electrode 110, an inner electrode 140, an end cap 112, fasteners 114, and a compression member 148. The housing electrode 110 serves as a second electrode opposite the inner electrode 140. The housing electrode 110 serves an outer electrode.

The lower housing assembly or housing electrode 110 includes two discreet housing parts (namely, a first housing part or member or base housing member 120 and a second housing part or member or extension housing member 130) and an annular sealing member 116. The housing electrode 110 includes a tubular housing side wall 117 and defines a housing cavity 119.

The base housing member 120 (FIGS. 4 and 5) is a cup-shaped metallic structure. The base housing member 120 has an end or electrode wall 122 and an integral tubular, cylindrical side wall 123 extending from the end wall 122. The inner surface of the side wall 123 is cylindrical. The side wall 123 and the end wall 122 form a chamber or base cavity 125 communicating with an opening 125A. A threaded terminal post 124 projects axially outwardly from the end wall 122. The end wall 122 has an inwardly facing, substantially planar contact surface 122A. A male screw thread 126 is formed on the outer surface of the side wall 123 at the opening 125A. An annular, substantially planar contact surface 123A is provided below the thread 126 proximate the upper end of the side wall 123. An O-ring groove 128 and a cover locator feature or groove 127 are also defined in the outer surface of the side wall 123.

According to some embodiments, the base housing member 120 is formed of metal. According to some embodiments, the base housing member 120 is formed of aluminum. According to some embodiments, the base housing member 120 is unitary and, in some embodiments, monolithic. The base housing member 120 as illustrated is cylindrically shaped, but may be shaped differently.

The extension housing member 130 (FIGS. 4 and 6) includes a cylindrical, tubular side wall 133 defining a passage 135 and opposed end openings 135A. A female screw thread 136 is formed on the outer surface of the side wall 133 at the lower opening 135A. An annular, substantially planar contact surface 133A is provided below the thread 136 at the lower end of the side wall 133. A cover locator feature or groove 137 and a locking groove 139 are also defined in the outer surface of the side wall 133. Fastener holes 138 (e.g., three or more) are defined in the upper end of the side wall 133.

The extension housing member 130 includes an annular, integral flange 134 that projects radially inward from the inner surface of the side wall 133. The flange 134 includes a rounded top face 134A, a planar bottom face 134C, and an inwardly facing side face 134B.

According to some embodiments, the extension housing member 130 is formed of metal. According to some embodiments, the extension housing member 130 is formed of aluminum. According to some embodiments, the extension housing member 130 is unitary and, in some embodiments, monolithic. The extension housing member 130 as illustrated is cylindrically shaped, but may be shaped differently.

In some embodiments, the combined thickness T1 (FIG. 4) of the flange 134 and the side wall 133 at the flange 134 is greater than the thickness T2 of the side wall 133 above and below the flange 134. In some embodiments, the thickness T1 is at least 15 percent greater than the thickness T2.

According to some embodiments, the annular sealing member 116 is an O-ring. The sealing member 116 may be of any suitable material. According to some embodiments, the sealing member 116 is formed of a resilient material, such as an elastomer. According to some embodiments, the sealing member 116 is formed of rubber. The sealing member 116 may be formed of fluoropolymer (e.g., VITON™ FKM polymer by DuPont). According to some embodiments, the rubber has a durometer of between about 60 Shore A and 90 Shore A.

Figure 4:
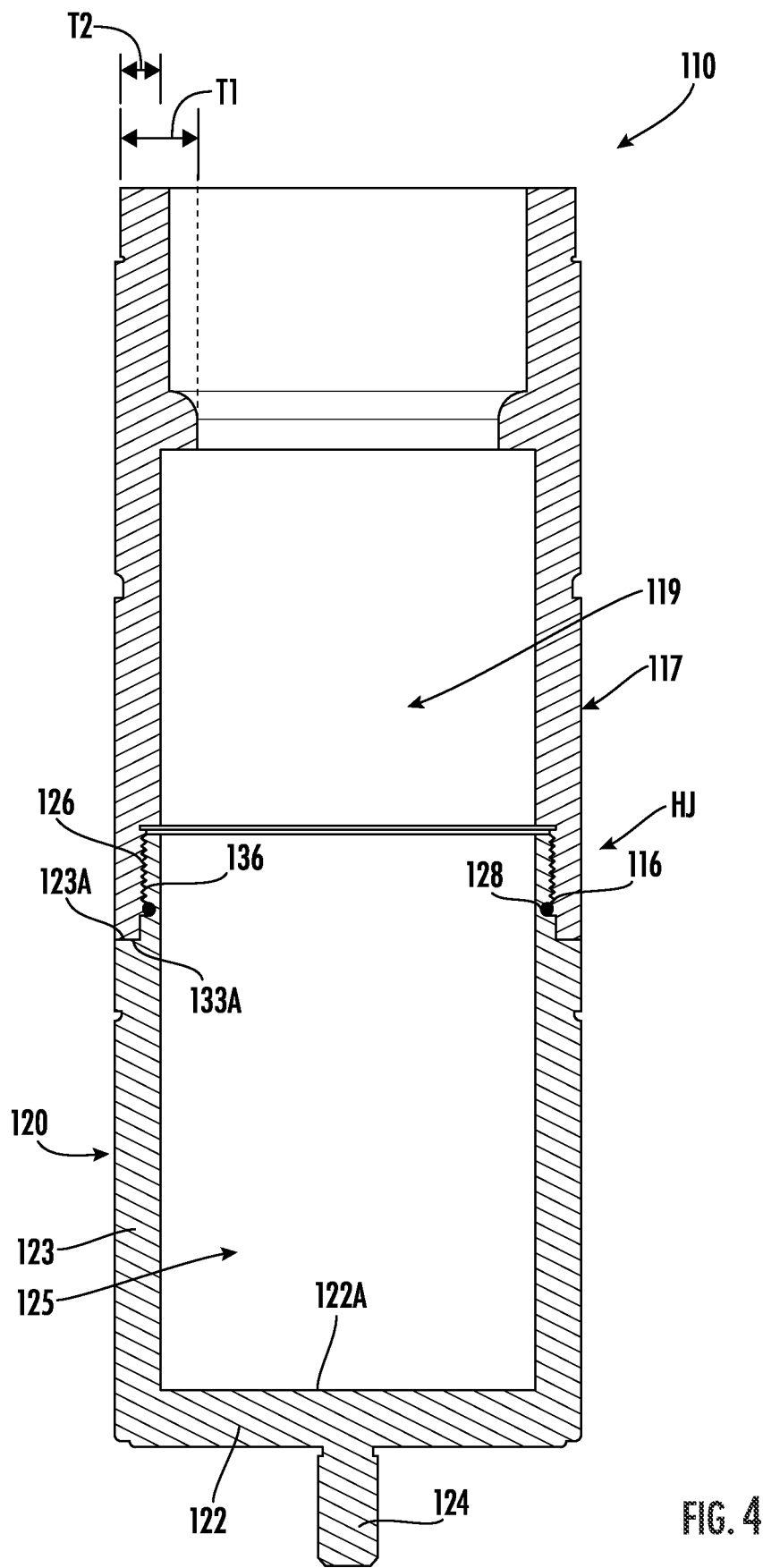
FIG. 4 is a cross-sectional view of a housing electrode forming a part of the OVPD module of FIG. 1 taken along the line 2-2 of FIG. 1.
Figure 5:
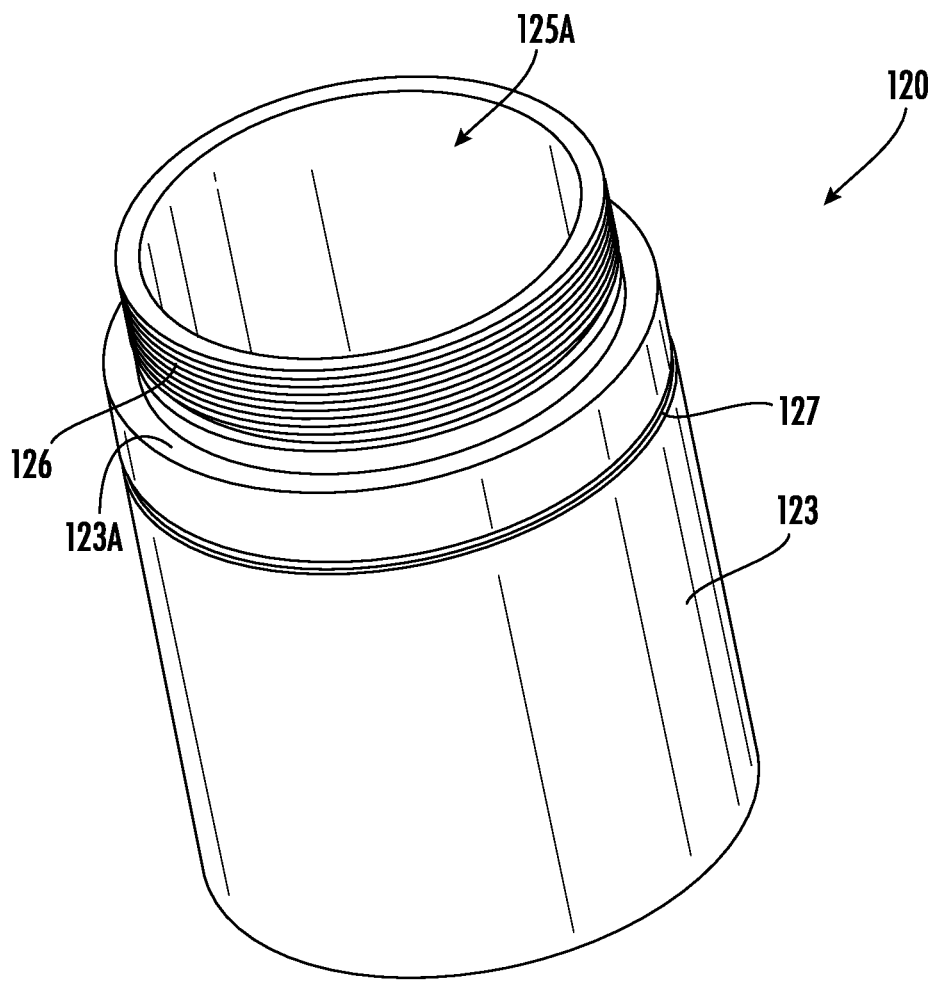
FIG. 5 is a top perspective view of a base housing member forming a part of the housing electrode of FIG. 4.
Figure 6:
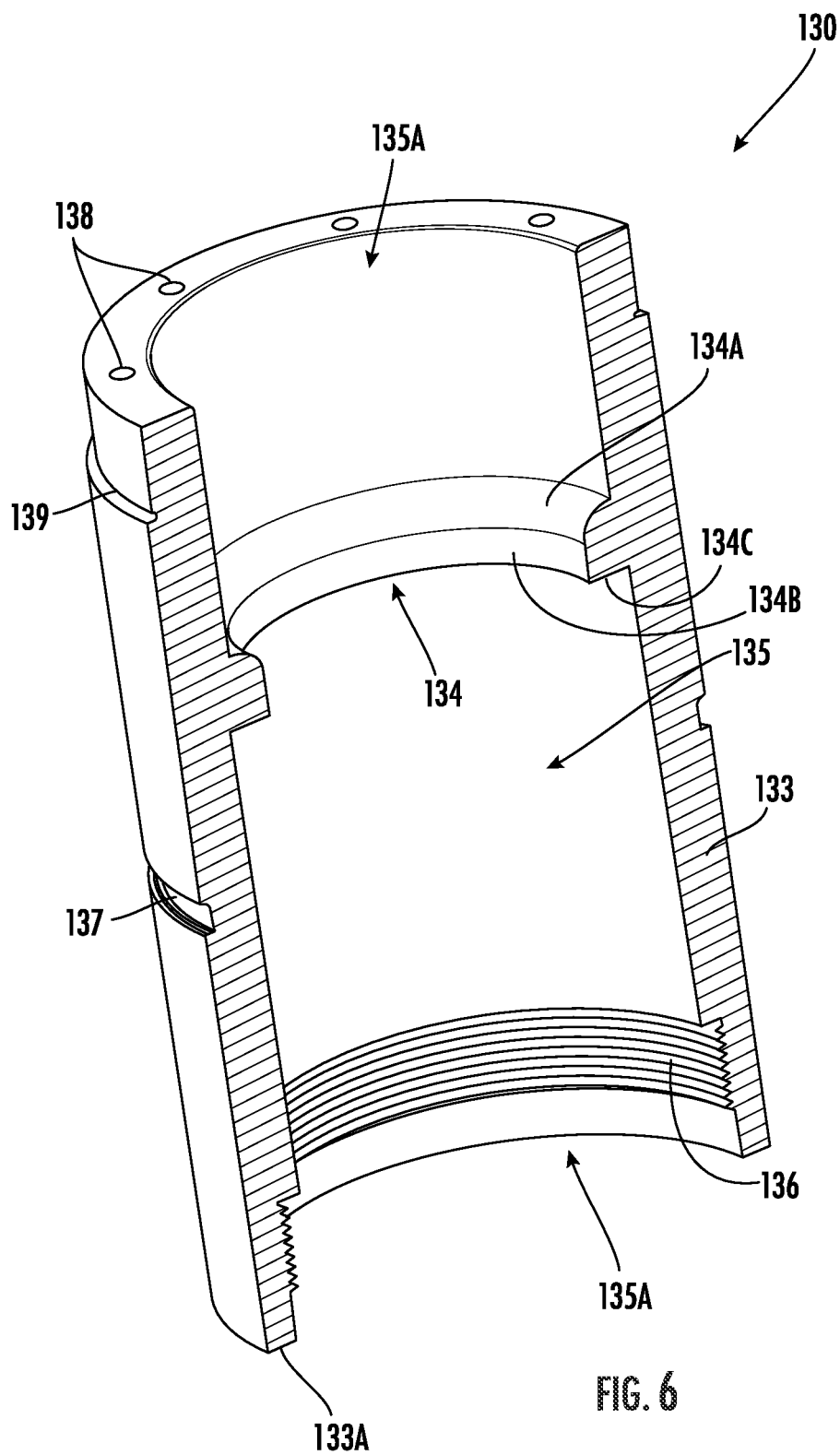
FIG. 6 is a top perspective, cross-sectional view of an extension housing member forming a part of the housing electrode of FIG. 4.
Figure 7:
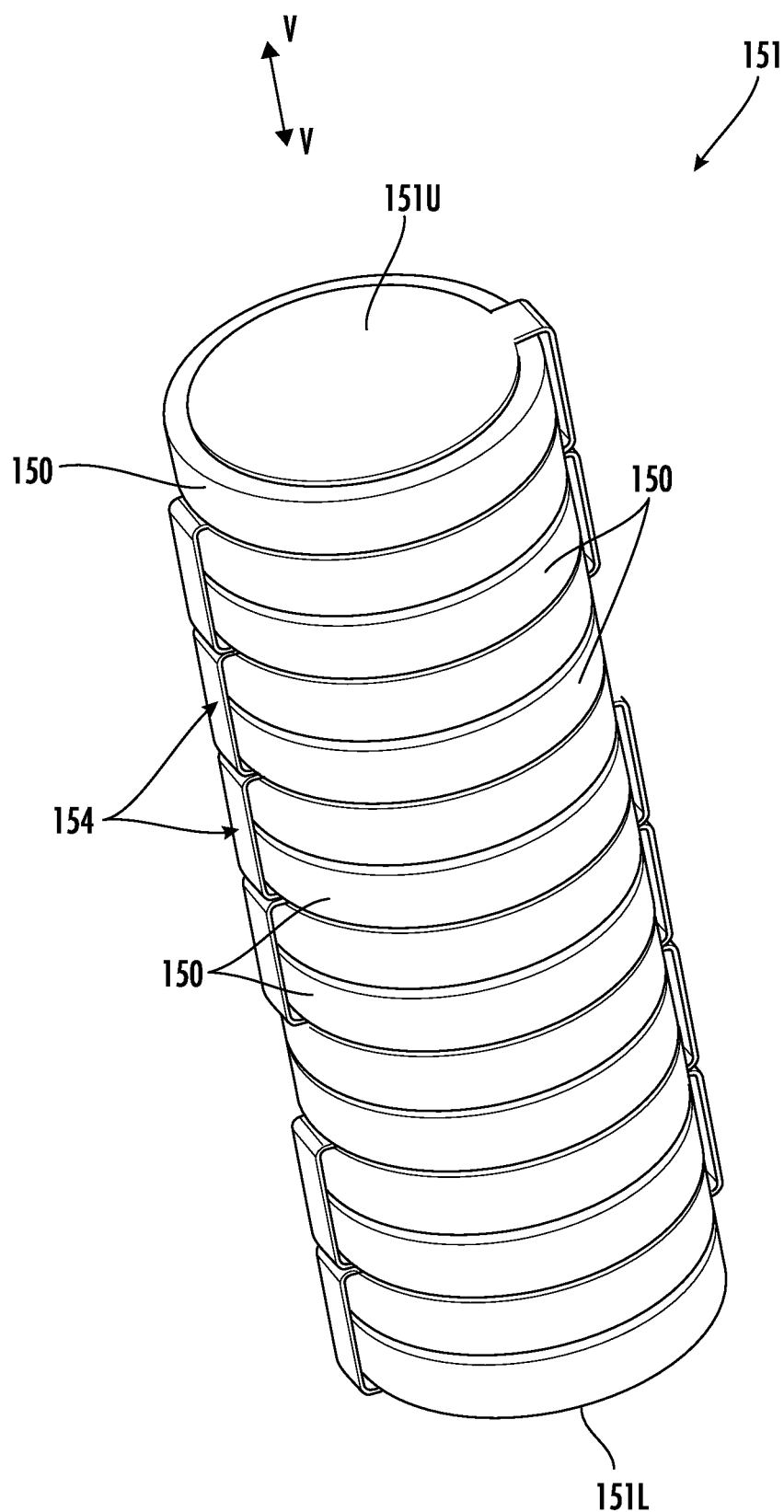
FIG. 7 is a top perspective view of a varistor stack forming a part of the OVPD module of FIG. 1.
Figure 8:
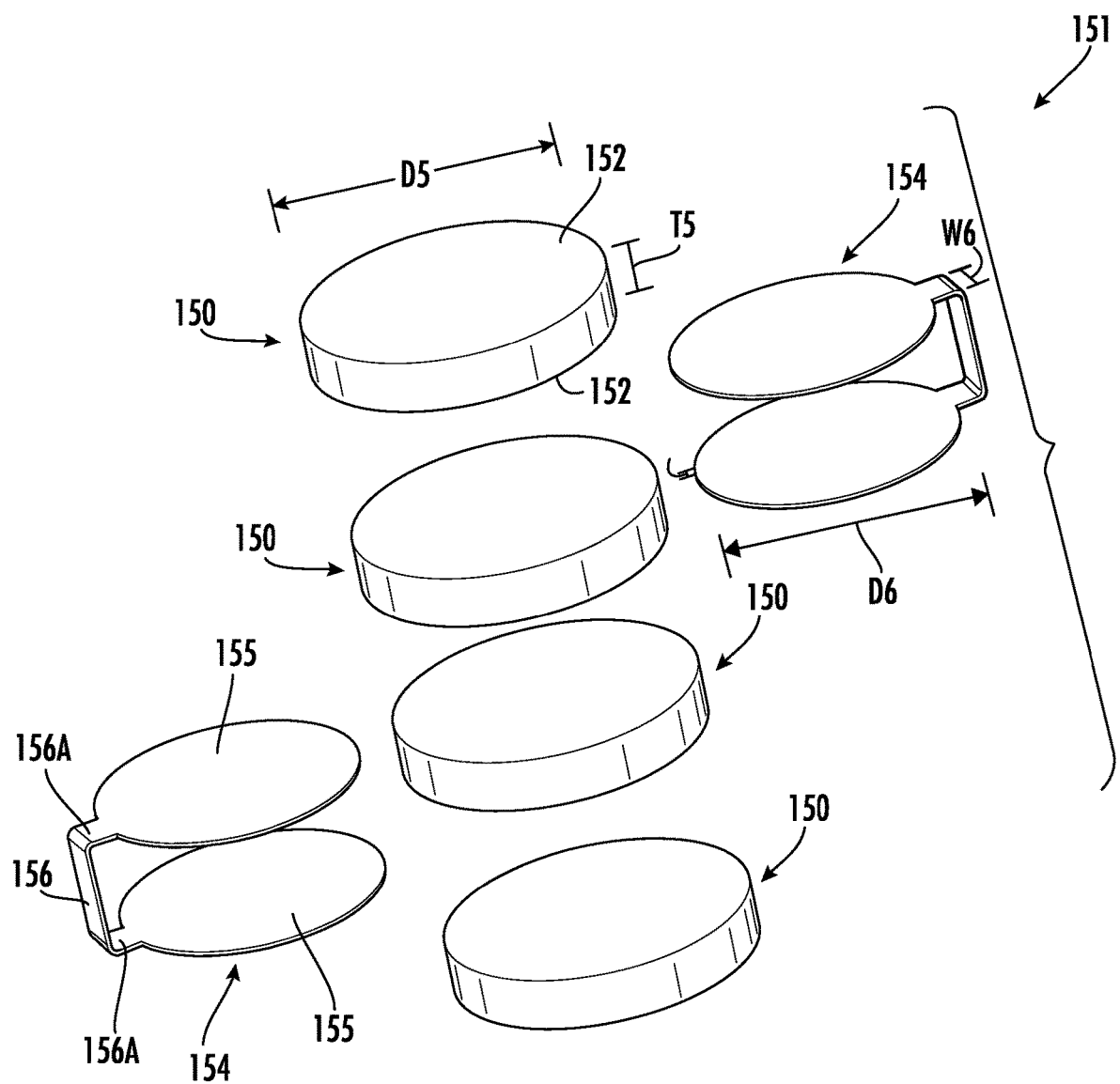
FIG. 8 is a fragmentary, exploded, perspective view of the varistor stack of the of FIG. 7.

With reference to FIG. 4, the O-ring 116 (or other sealing member) is seated in the groove 128. The base housing member 120 and the extension housing member 130 are securely fixed together or joined by mating and screwing together the threads 126 and 136 to form a joint HJ. The members 120, 130 are sealed at the joint HJ by the O-ring. The members 120, 130 together form a strong, rigid cup-shaped structure. The members 120, 130 are electrically connected by contact mating between the contact surfaces 123A, 133A. The base housing member 120 and the extension housing member 130 are thus axially stacked along the module axis A-A and in electrical continuity with one another. The base housing member tubular side wall 123 and the extension housing member tubular 133 each form a portion of the housing side wall 117. The base housing member cavity 125 and the extension housing member passage 135 form respective portions of the housing cavity 119.

The OVPD housing assembly 111 defines an environmentally sealed, enclosed module chamber 104 that includes the cavity 125 and the passage 135. The module chamber 104 is partitioned into an upper or meltable member chamber 104U, a lower or varistor chamber 104L, and an intermediate or membrane chamber 104M by a flange 134, the inner electrode 140, and a barrier flange 166B, as discussed below.

The inner electrode 140 (FIGS. 2 and 3) has a head 144 disposed in the intermediate chamber 104M and an integral shaft 142 that projects outwardly through the upper opening 135A.

The head 144 has a substantially planar contact surface 144A that faces the contact surface 122A of the electrode wall 122. The head 144 also has an annular outer side surface 144B.

An integral, annular flange 146 extends radially outwardly from the shaft 142. An annular, sidewardly opening groove 145 is defined by the flange 146 and the head 144 therebetween. A threaded terminal bore 142A is formed in the end of the shaft 142 to receive a bolt for securing the electrode 140 to a cable or busbar, for example.

According to some embodiments, the inner electrode 140 is formed of aluminum. However, any suitable electrically conductive metal may be used. According to some embodiments, the inner electrode 140 is unitary and, in some embodiments, monolithic.

The end cap 112 (FIGS. 2 and 3) is substantially plate-shaped and has a profile matching that of the top end of the extension housing member 130. A shaft opening 112A and screw holes 112B are defined in the end cap 112.

According to some embodiments, the end cap 112 is formed of an electrically conductive material. In some embodiments, the end cap 112 is formed of a metal and, in some embodiments, it is formed of aluminum.

The meltable member 172 (FIGS. 2 and 3) is annular and is mounted on the inner electrode 140 in the groove 145 within the upper chamber 104U. In some embodiments and as shown, the meltable member 172 is a cylindrical, tubular piece or sleeve. According to some embodiments, the meltable member 172 contacts the shaft 142 and, according to some embodiments, the meltable member 172 contacts the shaft 142 along substantially the full length of the meltable member 172 and the full length of the shaft 142. The meltable member 172 may also engage the lower surface of the flange 134 and the top surface of the head 144. The meltable member 172 is spaced apart from the side wall 133 a distance sufficient to electrically isolate the meltable member 172 from the side wall 133.

The meltable member 172 is formed of a heat-meltable, electrically conductive material. According to some embodiments, the meltable member 172 is formed of metal. According to some embodiments, the meltable member 172 is formed of an electrically conductive metal alloy. According to some embodiments, the meltable member 172 is formed of a metal alloy from the group consisting of aluminum alloy, zinc alloy, and/or tin alloy. However, any suitable electrically conductive metal may be used.

According to some embodiments, the meltable member 172 is selected such that its melting point is greater than a prescribed maximum standard operating temperature. The maximum standard operating temperature may be the greatest temperature expected in the meltable member 172 during normal operation (including handling overvoltage surges within the designed for range of the OVPD module 100) but not during operation which, if left unchecked, would result in thermal runaway. According to some embodiments, the meltable member 172 is formed of a material having a melting point in the range of from about 80 to 160° C. and, according to some embodiments, in the range of from about 80 to 120° C. According to some embodiments, the melting point of the meltable member 172 is at least 20° C. less than the melting points of the extension housing member 130, the inner electrode 140 and the membrane 170, and, according to some embodiments, at least 40° C. less than the melting points of those components.

According to some embodiments, the meltable member 172 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The meltable member 172 can be mounted on the electrode 140 in any suitable manner. According to some embodiments, the meltable member 172 is cast or molded onto the electrode 140. According to some embodiments, the meltable member 172 is mechanically secured onto the electrode 140. According to some embodiments, the meltable member 172 is unitary and, in some embodiments, monolithic.

A first annular gap G1 (FIG. 16) is defined radially between the head 144 and the flange side face 134B. According to some embodiments, the gap G1 has a radial width W3 (FIG. 16) in the range of from about 0.1 mm to 1.0 mm.

A second annular gap G2 (FIG. 16) is defined radially between the meltable member 172 and the side wall 133. The gap G2 defines a tubular void 105 that circumferentially surrounds the meltable member 172. The gap G2 has a larger radial width W4 (FIG. 16) than the width W3 of the gap G1. According to some embodiments, the width W4 is in the range of from about 1.5 mm to 20.0 mm. According to some embodiments, the width W4 is at least 6 times the width W3.

The varistor stack 151 (FIGS. 7 and 8) includes a plurality of varistor members 150 and a plurality of internal interconnect members 154. The varistor members 150 and the interconnect members 154 are axially stacked in the lower chamber 104L between the electrode head 144 and the electrode end wall 122 and form the varistor stack 151. The varistor members 150 and the interconnect members 154 are axially aligned along a varistor stack axis V-V, which may be parallel or coaxial with the OVPD module axis A-A. The interconnect members 154 electrically interconnect the varistor members 150 and the electrodes 110, 140.

The arrangement of the varistor members 150 and the interconnect members 154 may electrically connect the varistor members 150 in electrical parallel between the electrodes 110, 140, in electrical series between the electrodes 110, 140, or in both electrical parallel and electrical series between the electrodes 110, 140. In the embodiment illustrated in FIGS. 1-3 and 7, the varistor stack 151 includes fifteen varistor members 150 and twelve interconnect members 154 arranged to provide three varistor substacks in series, with each varistor substack including five varistors 150 in parallel. However, other numbers and arrangements of the varistor members 150 and interconnect members 154 may be provided. In alternative embodiments, some or all of the varistor members 150 are stacked without interconnect members 154. For example, the OVPD module may be assembled with no interconnect members 154.

According to some embodiments, each varistor member 150 is a varistor wafer (i.e., is wafer- or disk-shaped). In some embodiments, each varistor wafer 150 is circular in shape and has a substantially uniform thickness. However, varistor wafers 150 may be formed in other shapes. The thickness and the diameter of the varistor wafers 150 will depend on the varistor characteristics desired for the particular application.

In some embodiments, each varistor wafer 150 has a diameter D5 (FIG. 8) to thickness T5 (FIG. 8) ratio of at least 0.2. In some embodiments, the thickness T5 of each varistor wafer 150 is in the range of from about 1 to 30 mm. In some embodiments, the diameter D5 of each varistor wafer 150 is in the range of from about 20 to 150 mm.

Each varistor wafer 150 has first and second opposed, substantially planar contact surfaces 152.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

Each varistor wafer 150 may include a wafer of varistor material coated on either side with a conductive coating so that the exposed surfaces of the coatings serve as the contact surfaces 152. The coatings can be metallization formed of aluminum, copper or silver, for example. Alternatively, the bare surfaces of the varistor material may serve as the contact surfaces 152.

The interconnect members 154 are electrically conductive. Each interconnect member 154 includes a pair of axially spaced apart, disk-shaped contact portions 155 joined by a bridge portion 156.

According to some embodiments, each contact portion 155 is substantially planar, relatively thin and wafer- or disk-shaped. In some embodiments, each contact portion 155 has a diameter D6 (FIG. 8) to thickness T6 (FIG. 8) ratio of at least 10. In some embodiments, the thickness T6 of each contact portion 155 is in the range of from about 0.4 mm to 3.0 mm.

According to some embodiments, each contact portion 155 does not have any through holes extending through the thickness of the contact portion.

In some embodiments, the width W6 (FIG. 8) of each bridge portion 156 is in the range of from about 4.0 mm to 30.0 mm. The cross-sectional area of each bridge portion 156 should be large enough to withstand the short circuit current that may flow through the OVPD after a possible failure of one or more of the varistor wafers 150.

According to some embodiments, the interconnect members 154 are formed of copper. However, any suitable electrically conductive metal may be used. According to some embodiments, the interconnect members 154 are unitary and, in some embodiments, monolithic.

In the varistor stack 151, the contact portions 155 of the interconnect members 154 are interposed or sandwiched between the varistor wafers 150. The contact portions 155 engage respective ones of the varistor wafer contact surfaces 152. Each said engagement forms an intimate physical or mechanical contact between the interconnect member contact portions and varistor contact surfaces. Each said engagement forms a direct electrical connection or coupling between the interconnect member contact portions and varistor contact surfaces.

Each bridge portion 156 includes a pair of tab sections 156A (extending radially outwardly from the contact portions 155 and an axially extending connecting section 156B connecting the tab sections 156A and radially spaced apart from the adjacent peripheral edges of the varistor wafers 150. In some embodiments, each connecting section 156B is located a distance E6 (FIG. 16) from the adjacent peripheral edges of the varistor wafers 150. In some embodiments, the distance E6 is in the range of from about 1.0 mm to 20.0 mm.

The endmost electrical contact surfaces 151U and 151L form the effective electrical contacts between the varistor assembly stack 151 and the electrodes 144 and 110, respectively. The endmost electrical contact surfaces 151U and 151L may each be a varistor contact face 152, a contact portion 155, or an additional electrically conductive component (e.g., a metal spacer plate 159 (FIGS. 3 and 16)).

The insulator stack assembly 160 (FIGS. 9-11) includes a plurality of insulator bodies or sleeves 162, 164 and a plurality of gaskets 168. The insulator sleeves 162, 164 and gaskets 168 are axially stacked in the lower chamber 104L between the electrode head 144 and the electrode wall 122 and form the insulator stack assembly 160. The insulator sleeves 162, 164 and gaskets 168 are axially stacked along the varistor stack axis V-V.

Figure 9:
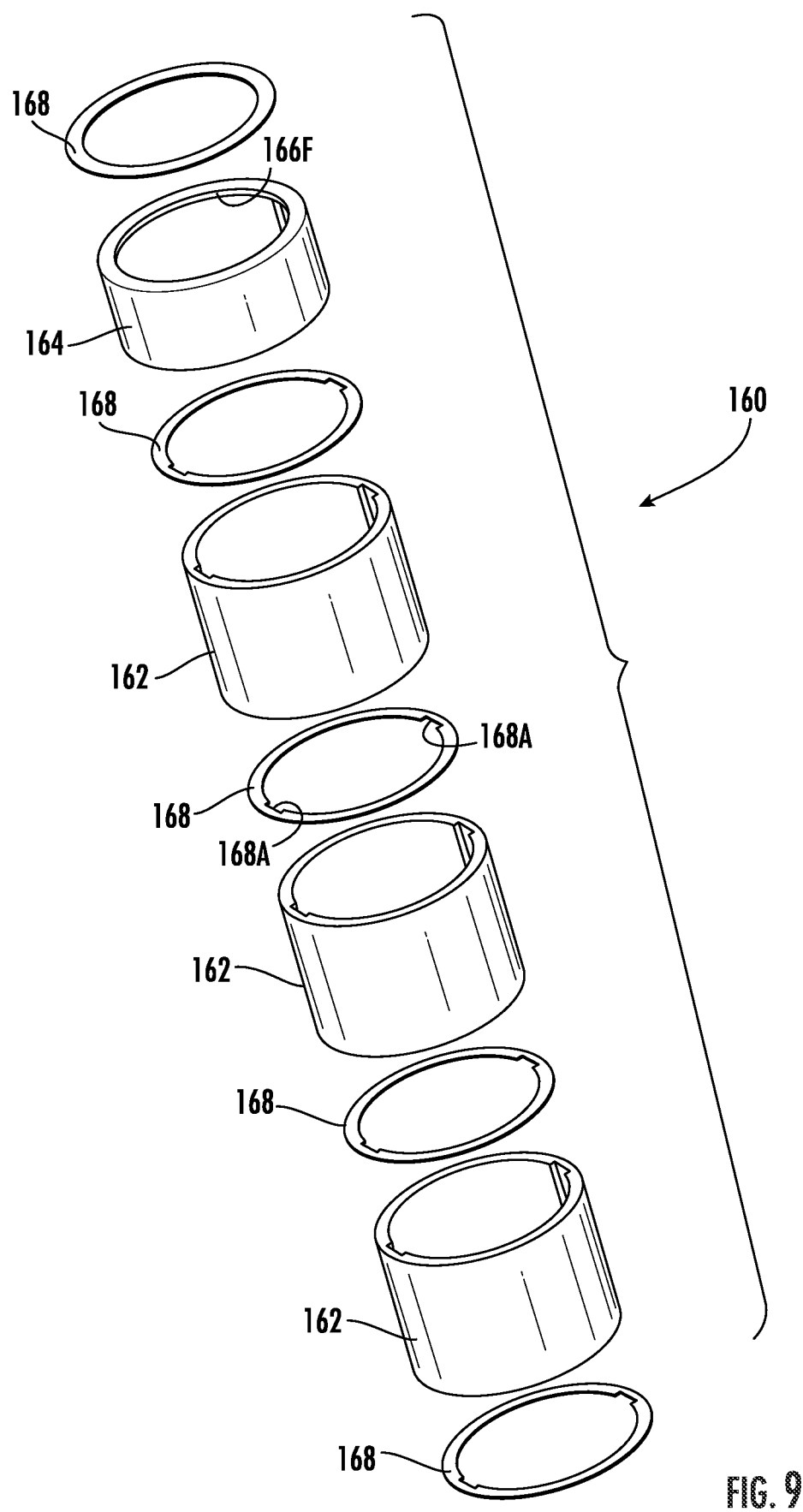
FIG. 9 is an exploded, top perspective view of an insulator stack assembly forming a part of the OVPD module of FIG. 1.
Figure 10:
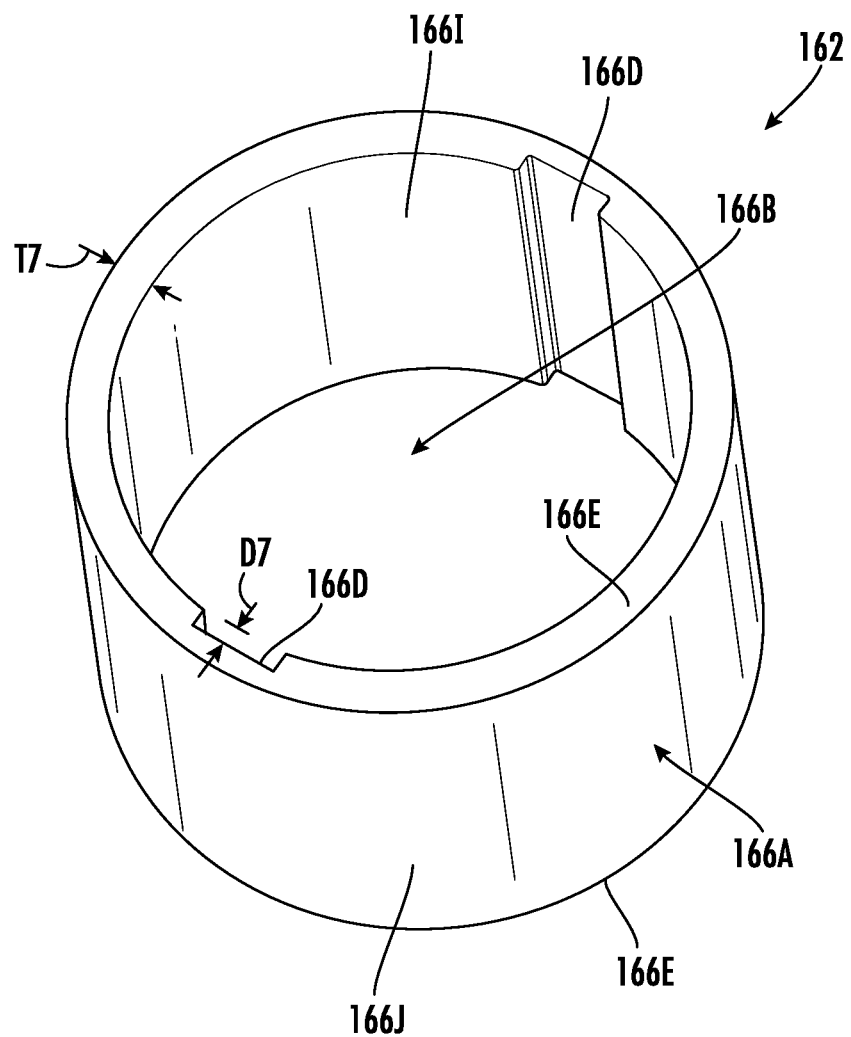
FIG. 10 is a top perspective view of an insulator sleeve member forming a part of the insulator stack assembly of FIG. 9.
Figure 11:
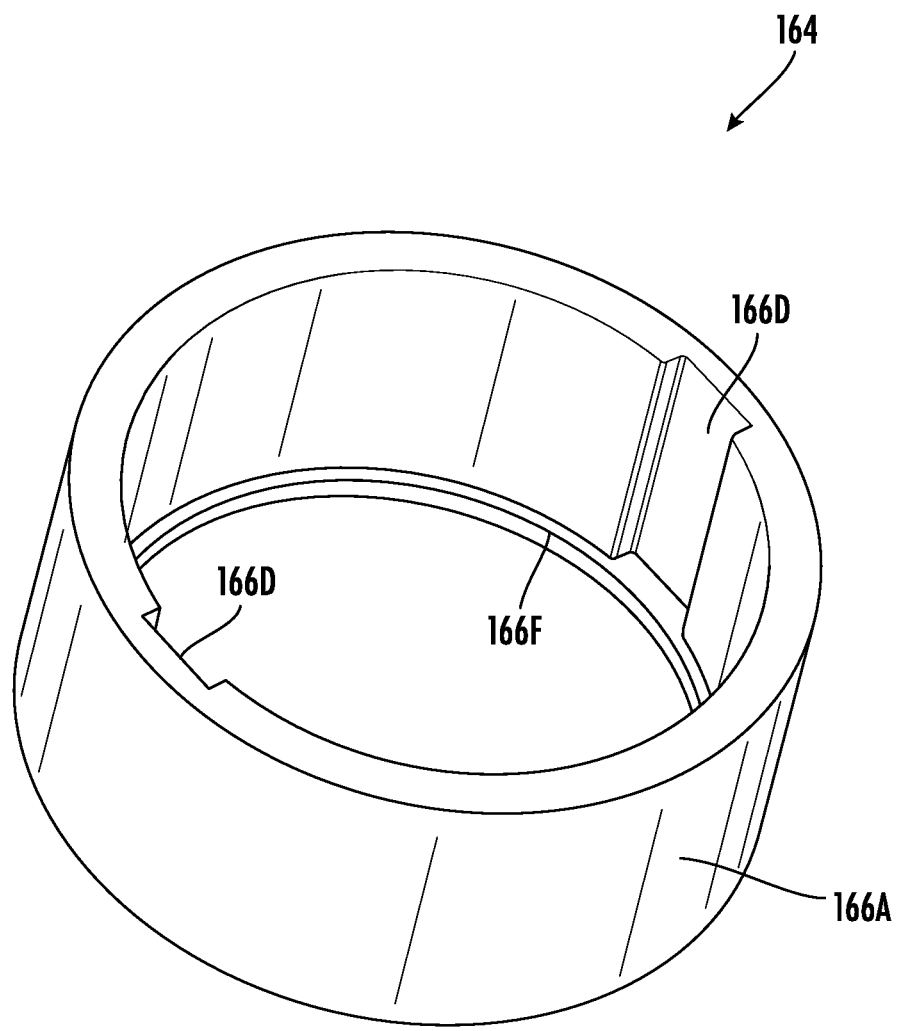
FIG. 11 is a top perspective view of a top end insulator sleeve member forming a part of the insulator stack assembly of FIG. 9.
Figure 12:
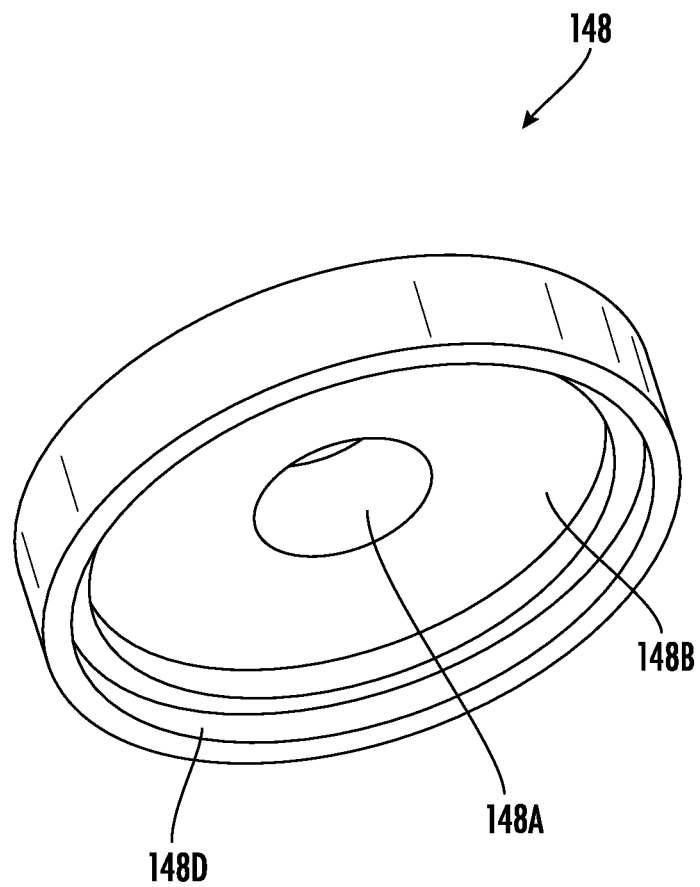
FIG. 12 is a bottom perspective view of a compression member forming a part of the OVPD module of FIG. 1.
Figure 13:
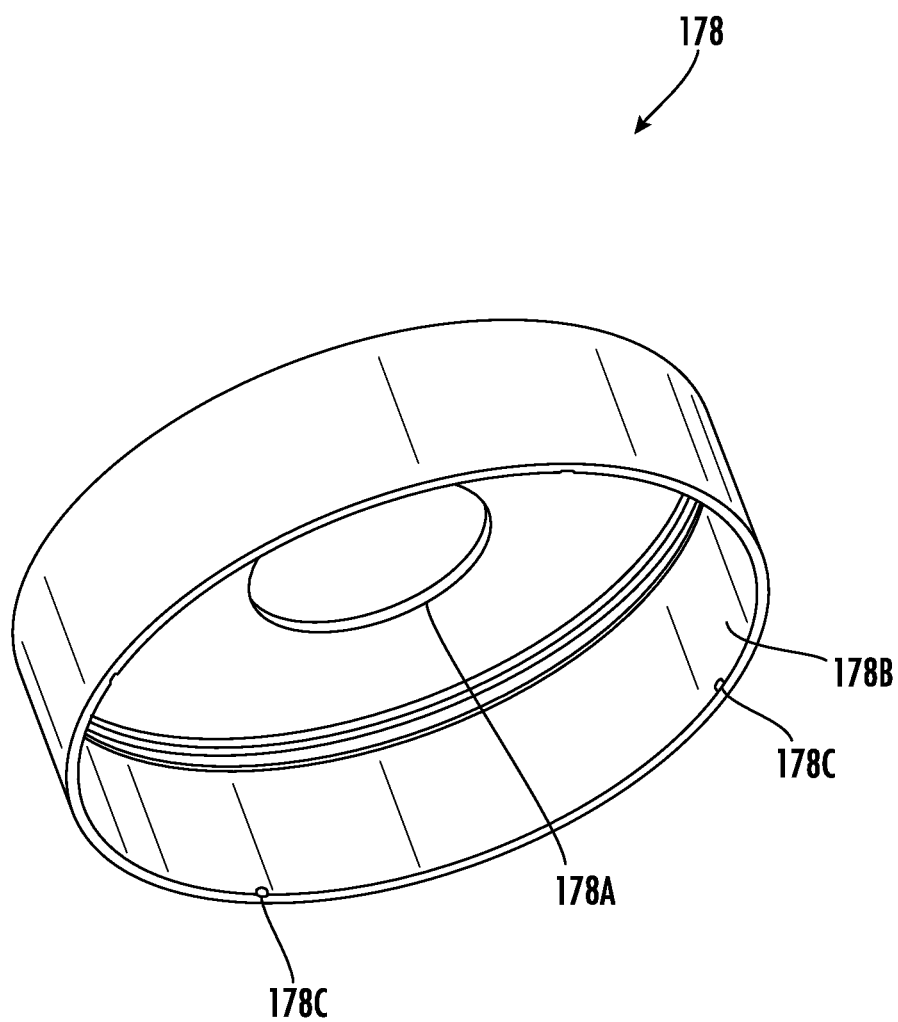
FIG. 13 is a bottom perspective view of an insulation cap forming a part of the OVPD module of FIG. 1.
Figure 14:
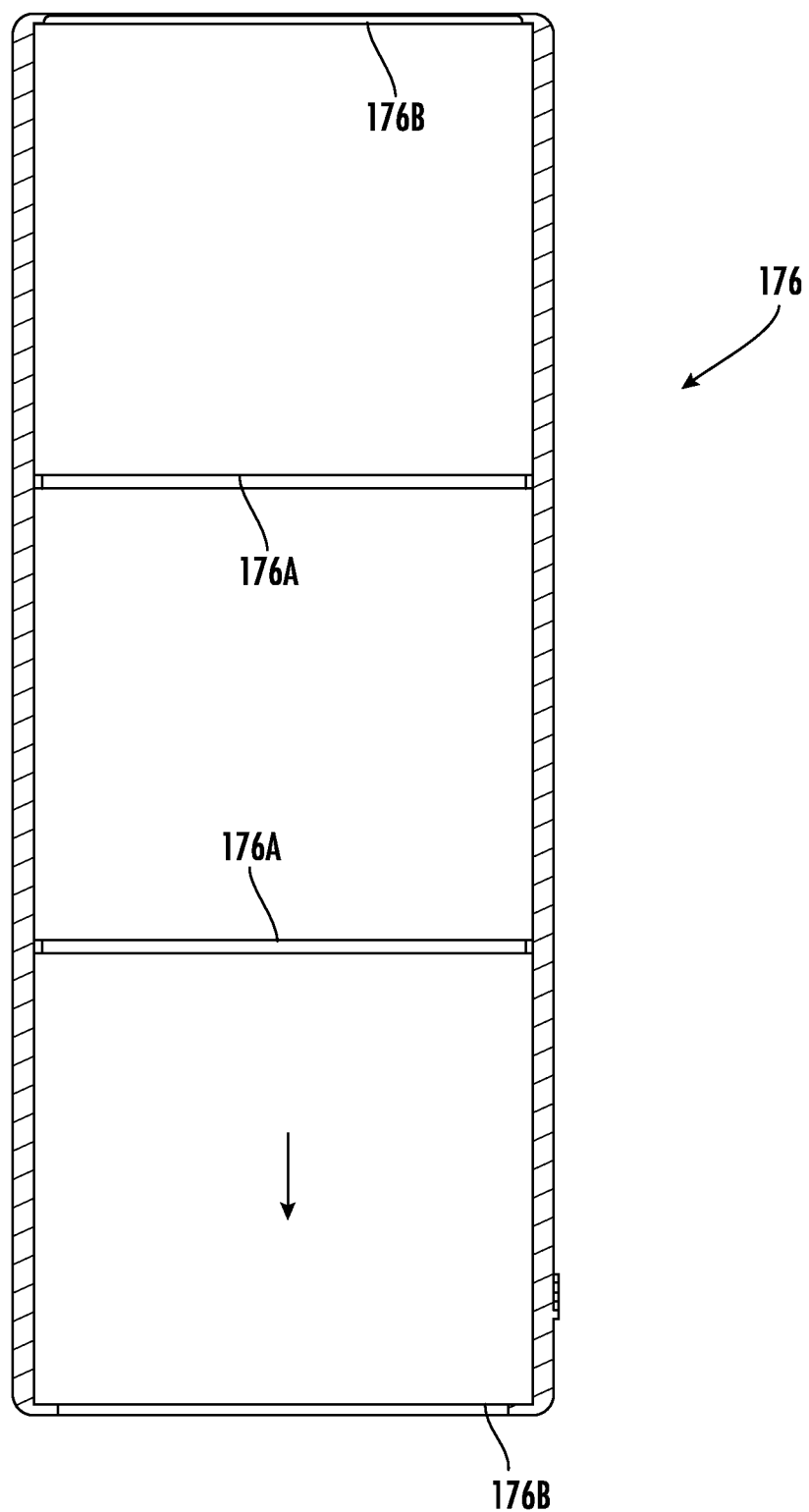
FIG. 14 is a cross-sectional view of an insulation cover forming a part of the OVPD module of FIG. 1.
Figure 15:
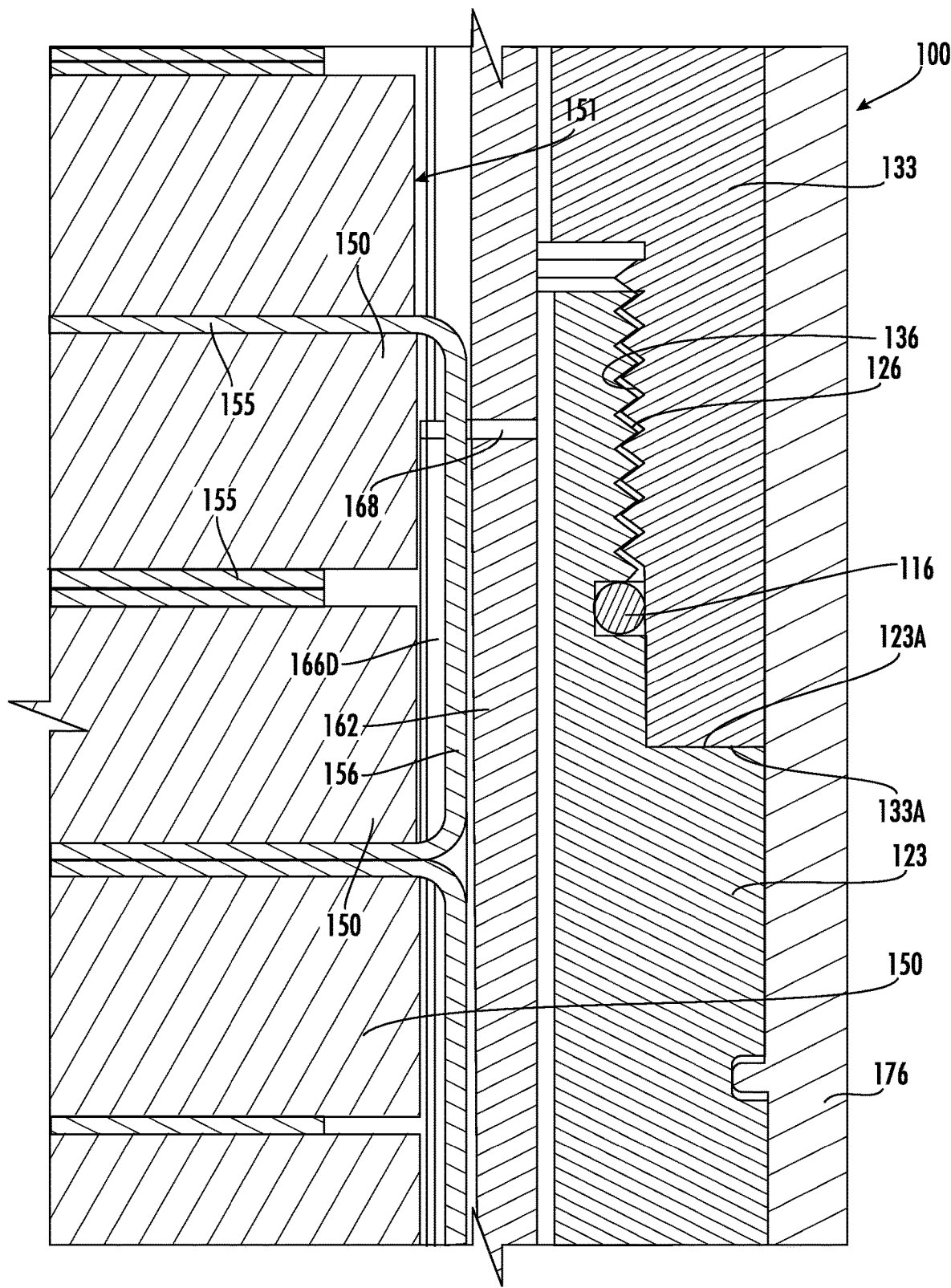
FIG. 15 is an enlarged, fragmentary, cross-sectional view of the OVPD module of FIG. 1 taken along the line 2-2 of FIG. 1.

In the embodiment illustrated in FIGS. 2 and 9, the insulator stack assembly 160 includes three base insulator sleeves 162 and a top end insulator sleeve 164. However, other numbers and arrangements of the insulator sleeves may be provided.

Each insulator sleeve 162, 164 (FIGS. 10 and 11) is tubular and includes a side wall 166A defining a through passage 166B. The outer surface of each insulator sleeve 162, 164 is cylindrical and sized and shaped to substantially match the contour of the inner surface of the side wall 123. The inner surface of each insulator sleeve 162, 164 is partially cylindrical to match the contours of the varistor wafers 150. Axially extending slots or receiver channels 166D are defined in the inner surface 166I of the side wall 166A. Each insulator sleeve 162, 164 has axially opposed end faces 166E. The outer surface 166J of each insulator sleeve 162, 164 is generally cylindrical.

The top end insulator sleeve 164 (FIG. 11) further includes an annular barrier flange 166F on its upper end. The barrier flange 166F extends radially inward.

The insulator sleeves 162, 164 are each formed of an electrically insulating material. According to some embodiments, each insulator sleeve 162, 164 is formed of an electrically insulating ceramic. Suitable ceramic insulation materials may include alumina, zirconia, zirconia toughened alumina (ZTA), or silicon nitride. According to some embodiments, each insulator sleeve 162, 164 is formed of an electrically insulating high temperature plastic. Suitable high temperature insulation materials may include ULTEM™ 1000, KETRON® 1000 PEEK and similar materials.

According to some embodiments, each insulator sleeve 162, 164 is formed of a material that can withstand a voltage of at least 10 kV per mm of thickness.

According to some embodiments, each side wall 166A has a nominal thickness T7 (FIG. 10) of at least 5 mm and, in some embodiments in the range of from about 3 to 40 mm. According to some embodiments, the depth D7 (FIG. 10) of each receiver channel 166D is at least 3 mm and, in some embodiments, in the range of from about 4 to 30 mm.

The gaskets 168 are annular and may be flat. Some or all the gaskets 168 may include side notches, cut outs or recesses 168A. The gaskets 168 may be shaped the same as or similar to the shapes of the engaging end faces 166C of the insulator sleeves 162, 164.

In some embodiments, the gaskets 168 may be formed of an electrically insulating, resilient, elastomeric material. According to some embodiments, the gaskets 168 are formed of rubber. According to some embodiments, the gaskets 168 are formed of silicone rubber. Suitable materials may include silicone rubber (e.g., VMQ silicone rubber), Styrene Butadiene rubber (SBR), or Polyurethane (PU) elastomers.

In some embodiments, each gasket 168 has a thickness in the range of from about 1 mm to 3 mm.

The gaskets 168 are axially interposed between the end faces 166C of the insulator sleeves 162, 164. The recesses 168A are aligned with the receiver channels 166D. The insulator stack assembly 160 circumferentially surrounds the varistor stack 151 through the chamber 104L. The varistor stack 151 is thus separated from the side wall 133 by the insulator stack assembly 160 which is radially interposed therebetween. The barrier flange 166F is positioned immediately below the flange 134 and surrounds the bottom of the head 144.

The membrane 170 (FIGS. 2, 3 and 16) is tubular, relatively thin, and generally cylindrical. The membrane 170 circumferentially surrounds the head 144. In some embodiments, the membrane 170 substantially fully fills the gap G1. In some embodiments, the membrane 170 extends from a top edge 170A above the flange 134 (i.e, in the upper chamber 104U) to a bottom edge 170B below the flange 134. In some embodiments, the bottom edge 170B coincides with the bottom end of the head 144. In some embodiments, the membrane 170 circumferentially surrounds a lower portion of the meltable member 172.

The membrane 170 is formed of a dielectric or electrically insulating material having high melting and combustion temperatures, but which can be disintegrated (such as by melting, burning, combusting or vaporizing) when subjected to an electric arc or the high temperatures created by an electric arc.

According to some embodiments, the membrane 170 is formed of a high temperature polymer and, in some embodiments, a high temperature thermoplastic. In some embodiments, the membrane 170 is formed of polyetherimide (PEI), such as ULTEM™ thermoplastic available from SABIC of Saudi Arabia. In some embodiments, the membrane 170 is formed of non-reinforced polyetherimide or polypropylene.

According to some embodiments, the membrane 170 is formed of a material having a melting point greater than the melting point of the meltable member 172. According to some embodiments, the membrane 170 is formed of a material having a melting point in the range of from about 120 to 200° C. and, according to some embodiments, in the range of from about 140 to 160° C.

According to some embodiments, the membrane 170 material can withstand a voltage of 25 kV per mm of thickness.

According to some embodiments, the membrane 170 has a nominal thickness T8 (FIG. 16) in the range of from about 0.1 to 0.4 mm and, in some embodiments, of about 0.25 mm.

The compression member 148 (FIG. 12) is annular and includes a shaft opening 148A. The compression member 148 includes an annular main body 148B, an integral, annular upper flange 148C and an integral, annular lower flange 148D.

The compression member 148 is formed of an electrically insulating, resilient, elastomeric material. According to some embodiments, the compression member 148 is formed of a material having a hardness in the range of from about 60 Shore A to 85 Shore A. According to some embodiments, the compression member 148 is formed of rubber. According to some embodiments, the compression member 148 is formed of silicone rubber.

The main body 148B of the compression member 148 is captured axially between the end cap 112 and the electrode upper flange 146. The upper flange 148C extends through the end cap opening 112A and the shaft 142 of the electrode 140 extends through the opening 148A, so that the upper flange 148C fills the circumferential gap between the shaft 142 and the end cap 112. The lower flange 148D surrounds the electrode flange 146 so that the lower flange 148D fills the circumferential gap between the electrode flange 146 and the side wall 123.

The compression member 148 serves to electrically insulate the housing electrode 110 from the inner electrode 140. The compressed compression member 148 can also form a seal to constrain or prevent overvoltage event byproducts, such as hot gases and fragments from the varistor wafers 150 from escaping the enclosed chamber 104 through the housing electrode opening 135A.

The main body 148B of the compression member 148 is captured between the end cap 112 and the electrode upper flange 146 and axially compressed (i.e, axially loaded and elastically deformed from its relaxed state) so that the compression member 148 serves as a biasing member and applies a persistent axial pressure or load to the inner electrode 140 and the end cap 112. The compression member 148 thereby persistently biases, presses or loads the electrode head 144 and the end wall 122 against the varistor stack 151 along a load or clamping axis C-C in convergent directions to ensure firm and uniform engagement between the interfacing contact surfaces of the head 144, the end wall 122, the varistor members 136, and the interconnect members 154. In some embodiments, the clamping axis C-C is substantially coincident with the axis A-A.

The cover 176 (FIGS. 1, 2 and 14) is used to provide electrical insulation between the housing assembly 111 and surrounding space. The cover 176 is tubular and includes integral internal locator features in the form of ribs 176A. The cover 176 is configured to fit snugly around the housing electrode 110, extend from end 102A to end 102B. The ribs 176A seat in the grooves 128, 138. The cover 176 includes integral upper and lower lock flanges 176B that lock the cover 176 on the housing assembly 111.

The insulation cover 176 may be formed of any suitable electrically insulating material. According to some embodiments, the cover 176 is formed of rubber. According to some embodiments, the cover 176 is formed of silicone rubber.

The insulation cap 178 (FIG. 13) provides electrical insulation between the inner electrode 140, the end cap 112, the housing electrode 110 and surrounding space. The insulation cap 178 is generally cup-shaped. The cap 178 includes an opening 178A that snugly receives the compression member upper flange 148C. The cap 178 includes an annular flange 178B that is snugly interposed between the insulation cover 176 and the housing member 130. The flange 178B is provided with one or more latch features 178C that interlock with the locking groove 139 of the extension housing member 130 to secure the cap 178.

The insulation cap 178 may be formed of any suitable electrically insulating material. According to some embodiments, the insulation cap 178 is formed of rubber. According to some embodiments, the insulation cap 178 is formed of silicone rubber.

The OVPD module 100 can be assembled as follows in accordance with some embodiments. The varistor stack 151 and the insulator stack 160 are installed in the cavity 125 of the base housing member 120. The O-ring 116 is installed in the groove 128. The extension housing member 130 is then placed over the varistor stack 151 and the insulator stack 160 and screwed onto the base housing member 120 (using the threads 126, 136) until the contact surfaces 123A, 133A are pressed together. The flange 134 presses against the insulator sleeve 164 to fix the insulator stack 160 in place. In some embodiments, the components are configured such that the gaskets 168 are resiliently or elastically deformed and tend to push the insulator sleeves 162, 164 apart.

The membrane 170 and the inner electrode 140 are then inserted into the chamber 104M. In some embodiments, the membrane 170 is bonded or taped to the inner electrode 140 or to the flange 134. The compression member 148 is placed over the inner electrode 140. The end cap 112 is then bolted to the upper end of the extension housing member 130 using fasteners 114 and holes 138, thereby compressing the compression member 148, which in turn presses the inner electrode 140 against the varistor stack 151.

The insulation cap 178 is then installed over the end cap 112 and secured by the features 178C, 139. The outer cover 176 is then installed over the housing assembly 111 and the insulation cap 178 and secured by the features 176A, 176B, 127, 137.

In use, the OVPD module 100 may be connected directly across an AC or DC electrical line (for example, in an electrical service utility box or in assemblies employed in DC traction networks). Input and output lines are connected directly or indirectly to each of the inner electrode terminal 142A and the terminal post 124 such that an electrical flow path is provided through the inner electrode 140, the varistor stack 151, the housing electrode end wall 122 and the terminal post 124. Ordinarily, in the absence of an overvoltage condition, the varistor stack 151 provides high electrical resistance such that no significant current flows through the OVPD module 100 as it appears electrically as an open circuit. In the event of an overvoltage condition (relative to the design voltage of the device), the resistance of the varistor members 150 decreases rapidly, allowing current to flow through the OVPD module 100 and create a shunt path for current flow to protect other components of an associated electrical system. The general use and application of overvoltage protectors such as varistor devices is well known to those of skill in the art and, accordingly, will not be further detailed herein.

The head 144, flange 134, varistor stack 151, and membrane 170 are relatively constructed and configured to form the first fail-safe system 106. The meltable member 172 and the electrodes 140, 110 are relatively constructed and configured to form the second fail-safe system 108. The first fail-safe system 106 and the second fail-safe system 108 provide safe failure modes for the OVPD module 100. The fail-safe systems 106, 108 are adapted to prevent or inhibit overheating or thermal runaway of the OVPD module 100, as discussed in more detail below.

As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e, a leakage current or a surge current). The VNOM of a varistor is typically specified as the measured voltage across the varistor with a DC current of 1 mA.

As is known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

In the absence of an overvoltage condition, the varistor wafers 150 provide high resistance such that no current flows through the OVPD module 100 as it appears electrically as an open circuit. That is, ordinarily the varistor passes no current. The electrodes 110, 140 are electrically isolated from one another by the varistors 150, the membrane 170, and the insulator sleeves 162, 164. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the OVPD module 100 and create a shunt path for current flow to protect other components of an associated electrical system. Normally, the varistors 150 recover from these events without significant overheating of the OVPD module 100.

The VNOM of a given varistor begins at a certain value and over time could degrade to a lower effective VNOM value as a result of varistor aging. Typically, a varistor is initially rated for a "maximum continuous operating voltage" (MCOV), indicating that the VNOM of the varistor exceeds the rated MCOV when first placed in service. For example, the rated MCOV of a selected varistor may be 1500V, but may drop to 1300V due to aging.

Varistor aging (i.e, degradation resulting in reduction of the VNOM) can be caused by surge currents or continuous leakage currents (during continuous overvoltage events) applied to the varistor in service, as well as by passage of time with the nominal voltage applied on the varistor (rare case, typically caused by low quality varistors). Aging degradation is generally thermally induced.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

In some cases, the OVPD module 100 may assume an "end of life" mode in which the varistor wafer is depleted in full or in part (i.e, in an "end of life" state), leading to an end of life failure. When a varistor 150 of the OVPD module 100 reaches its end of life, the OVPD module 100 will become substantially a short circuit with a very low but non-zero ohmic resistance.

As a result, in an end of life condition, a fault current will continuously flow through the varistor 150 even in the absence of an overvoltage condition. As a result, notwithstanding the short circuit provided by the end of life OVPD module 100, the fault current may be insufficient to trip or blow an associated breaker or fuse. In this case, the current may continue to flow through the varistor 150, thereby generating heat from ohmic losses in the varistor 150. If the condition is permitted to persist, the heat generated in the OVPD module 100 may build up until the housing assembly 111 melts or explodes. Such an event may be regarded as catastrophic. If the fault current is of sufficient magnitude, the fault current will induce or generate electric arcing through and around the varistor 150 (herein, an "arcing event"). Such an arcing event may rapidly generate additional heat in the OVPD module 100 and/or may cause localized damage to other components of the OVPD module 100.

The first fail-safe system 106 and the second fail-safe system 108 are each adapted and configured to electrically short circuit the current applied to the OVPD module 100 around the varistor 150 to prevent or reduce the generation of heat in the varistor. In this way, the fail-safe systems 106, 108 can operate as switches to bypass the varistor 150 and prevent overheating and catastrophic failure as described above. According to embodiments of the invention, the fail-safe systems 106, 108 operate independently of one another. More particularly, in some embodiments, the fail-safe system 161 will operate to short circuit the OVPD module 100 when a first type or set of operating conditions are experienced by the OVPD module 100 and the fail-safe system 106 will operate to short circuit the OVPD module 100 when a second type or set of operating conditions, different from the first, are experienced by the OVPD module 100. That is, under different circumstances, the fail-safe system 108 may operate or execute first or the fail-safe system 106 may operate or execute first. Ordinarily, though not necessarily, only one of the fail-safe systems will execute, whereupon the conditions necessary to invoke the other fail-safe system will be prevented from arising.

The operation of the fail-safe systems 106, 108 will be described in more detail hereinbelow. As used herein, a fail-safe system is "triggered" upon occurrence of the conditions necessary to cause the fail-safe system to operate as described to short circuit the electrodes 110, 140.

Turning to the second fail-safe system 108 in more detail, when heated to a threshold temperature, the meltable member 172 will flow to bridge and electrically connect the electrodes 110, 140. The meltable member 172 thereby redirects the current applied to the device 100 to bypass the varistor 150 so that the current induced heating of the varistor 150 ceases. The fail-safe system 106 may thereby serve to prevent or inhibit thermal runaway without requiring that the current through the device 100 be interrupted.

More particularly, the meltable member 172 initially has a first configuration as shown in FIG. 2 such that it does not electrically couple the inner electrode 140 and the housing electrode 110 except through the head 144. Upon the occurrence of a heat buildup event, the inner electrode 140 is thereby heated. The meltable member 172 is also heated directly and/or by the inner electrode 140. During normal operation, the temperature in the meltable member 172 remains below its melting point so that the meltable member 172 remains in solid form. However, when the temperature of the meltable member 172 exceeds its melting point, the meltable member 172 melts (in full or in part) and flows by force of gravity into a second configuration different from the first configuration. When the device 100 is vertically oriented, the melted meltable member 172A accumulates in the lower portion of the chamber 104U as a reconfigured meltable member (which may be molten in whole or in part). The reconfigured meltable member 172A bridges or short circuits the inner electrode 140 to the housing electrode 110 to bypass the varistor stack 151. That is, a new direct flow path or paths are provided from the surface of the inner electrode 140 to the surfaces of the housing side wall 133 through the reconfigured meltable member 172A. According to some embodiments, at least some of these flow paths do not include the varistor stack 151.

The reconfigured meltable member 172A is typically contained in the chamber 104U. The molten meltable member 172A is contained on the upper end by the compression member 148. The molten meltable member 172A is contained on the lower end by the head 144, the flange 134 and the membrane 170. The barrier flange 166B can prevent the meltable member 172A from flowing into the lower chamber 104L and into the varistor stack 151.

According to some embodiments, the second fail-safe system 108 can be triggered by at least two alternative triggering sets of operating conditions, as follows.

The second fail-safe system 108 can be triggered by heat generated in a varistor 150 by a leakage current. More particularly, when the voltage across the varistor 150 exceeds the nominal clamping voltage VNOM, a leakage current will pass through the varistor 150 and generate heat therein from ohmic losses. This may occur because the VNOM has dropped due to varistor 150 aging and/or because the voltage applied by the circuit across the device 100 has increased.

The second fail-safe system 108 can also be triggered when a varistor 150 fails as a short circuit. In this case, the varistor 150 will generate heat from a fault current through the short circuit failure site (e.g., a pinhole in the varistor). The fault current generates heat (from high localized ohmic loss heating at the pinhole) in and adjacent the varistor 150. As discussed below, a fail-short varistor may trigger the first fail-safe system 106 instead of the second fail-safe system 108, depending on the magnitude of the fault current and other conditions.

Figure 16:
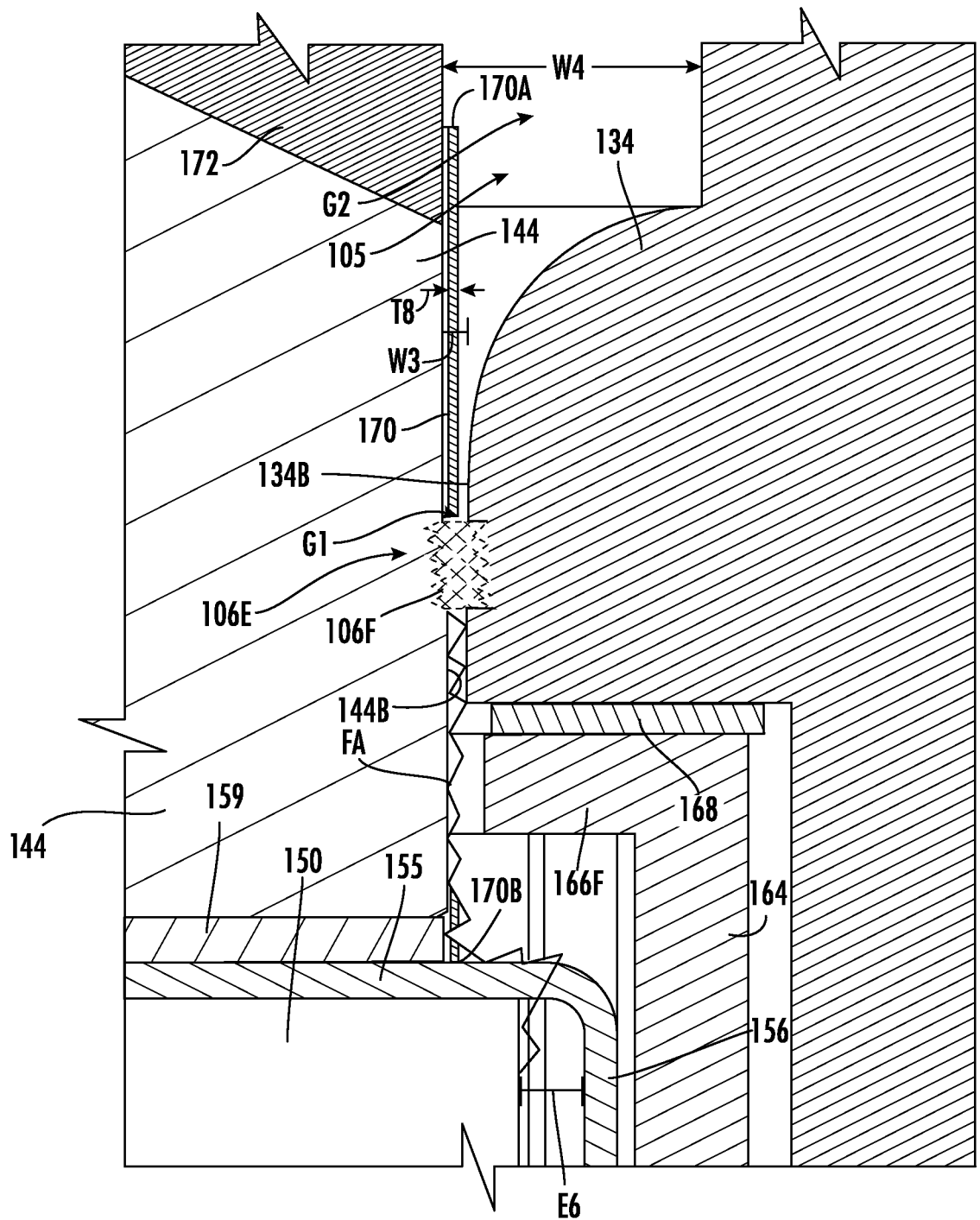
FIG. 16 is an enlarged, fragmentary, cross-sectional view of the OVPD module of FIG. 1 taken along the line 2-2 of FIG. 1.

The first fail-safe system 106 can be triggered when a varistor 150 fails as a short circuit. In this case, arcing will occur adjacent and within a short circuit failure site in the varistor 150 (i.e., the arc is initiated at the varistor 150). More particularly, the arcing FA will occur between the varistor 150 or an interconnect member 154 and one or both electrodes 110, 140. The arcing will propagate along the head 144 and, in some cases, the varistor stack 151. Ultimately, the arcing propagates or occurs directly between the outer peripheral side wall 144B of the electrode head 144 and the adjacent side surface 134B of the flange 134. This latter arcing causes a metal surface portion of the head side wall 144B and a metal surface portion of the flange side wall 134B to fuse or bond directly to one another in a prescribed region at a bonding or fusing site 106E to form a bonded or fused interface portion, or region 106F (FIG. 16). The arc FA fuses or bonds the surfaces and portions 134B, 144B. In some embodiments, the electrodes 110, 140 are both formed of aluminum or aluminum alloy, so that the bond is direct aluminum-to-aluminum, which can provide particularly low ohmic resistance. The fusing or bonding may occur by welding induced by the arc. In this way, the electrodes 110, 140 are shorted at the interface 106F to bypass the varistors 150 so that the current induced heating of the failed varistor 150 ceases.

The electrical insulation membrane 170 is provided between the flange side surface 134B and the electrode head 144 to provide electrical isolation in normal operation. However, the membrane 170 is formed of a material that is quickly disintegrated, melted or vaporized by the arcing so that the membrane 170 does not unduly impede the propagation of the arc or the bonding of the electrodes 110, 140 as described.

The void G2 above the flange 134 around the inner electrode 140 in the chamber 104U provides a break between the adjacent surfaces of the inner electrode 140 and the housing electrode 110 to extinguish the electric arc (i.e, to prevent the arc from continuing up the side wall 133). The void G2 reduces the time required to terminate the arc and facilitates more rapid formation of the bonded interface 106F.

In the event of a fail-short varistor, either or both first and second fail-safe systems 106, 108 may be triggered or activated. The first fail-safe system 106 requires a fault current sufficient to create the arcing, whereas the second fail-safe system 141 does not. When sufficient fault current is present to create the arcing, the first fail-safe system 106 will typically execute and form the electrode short circuit before the second fail-safe system 108 can form the meltable member short. However, if the applied current is insufficient to generate the arcing, the fault current will continue to heat the device 100 until the second fail-safe system 108 is activated. Thus, where a fail-short varistor is the trigger, the second fail-safe system 198 will operate for relatively low current and the first fail-safe system 106 will operate for relatively high current.

Thus, the meltable member 172 and the fused interface 106F each provide a direct electrical contact surface or a low resistance bridge between the inner electrode 140 and the housing electrode 110 and an enlarged current flow path (i.e, a lower resistance short circuit) via the meltable member 172 or the fused site 106F. In this way, the fault or leakage current is directed away from the varistor stack 151. The arcing, ohmic heating and/or other phenomena inducing heat generation are diminished or eliminated, and thermal runaway and/or excessive overheat of the OVPD module 100 can be prevented. The device 100 may thereby convert to a relatively low resistance element capable of maintaining a relatively high current safely (i.e, without catastrophic destruction of the device). The fail-safe systems 106, 108 can thus serve to protect the OVPD module 100 from catastrophic failure during its end of life mode. The present invention can provide a safe end of life mechanism for a varistor-based overvoltage device. It will be appreciated that the OVPD module 100 may be rendered unusable thereafter as an overvoltage protection device, but catastrophic destruction (e.g., resulting in combustion temperature, explosion, or release of materials from the OVPD module 100) is avoided.

According to some embodiments, the meltable member 172 bypass and the fused interface 106F bypass each have an ohmic resistance of less than about 1 mOhm.

In some embodiments, the OVPD module 100 may be effectively employed in any orientation. For example, the OVPD module 100 may be deployed in a vertical orientation or a horizontal orientation. When the meltable member 172 is melted by an overheat generation event, the meltable member 172 will flow to the lower portion of the chamber 104U where it forms a reconfigured meltable member (which may be molten in whole or in part) that bridges the inner electrode 140 and the housing electrode 110 as discussed above. The chamber 104U is sealed so that the molten meltable member 172 does not flow out of the chamber 104U.

According to some embodiments, overvoltage protection devices of the present invention (e.g., the device 100) are adapted to protect electrical components and assemblies from overvoltages in AC and DC electric circuits.

Overvoltage protection devices (e.g., the OVPD module 100) as disclosed herein can be particularly well-suited or advantageous when employed in a direct current (DC) circuit or system where the current conducted by the varistor stack 151 is very high. According to some embodiments, the OVPD module 100 is configured such that, when the fail-safe system 106 is triggered, the OVPD module 100 can withstand a short circuit current of at least 12 kA for more than 200 ms, and a permanent current flow of at least 1 A without overheating. The maximum temperature rise should not be more than 80 degrees Kelvin and the temperature rise 5 minutes after the failure of the device should not exceed 120 degrees Kelvin during the permanent current flow.

The multi-part lower housing assembly or housing electrode 110 provides advantages in design flexibility, manufacturability, and manufacturing cost. In some cases, it is necessary or desirable to provide the OVPD module 100 with a relatively tall varistor stack. For example, it may be necessary to provide thicker varistors and/or several varistors connected in parallel to accommodate high voltages and/or to absorb more energy without failing. The housing electrode 110 must be formed with greater depth to receive the tall varistor stack. The multi-part housing electrode 10 may be easier and less expensive to manufacture, as well as stronger, than a single piece housing electrode formed with the same depth and/or with the other features (e.g., the flange 134). For example, if one were to stamp or machine a deep housing electrode from a low-density metal like aluminum, the resulting structure may lack sufficient rigidity.

The flange 134 can be formed in a tubular member (the housing member 130) that is open at both ends, rather than having to be formed in a single housing member that is closed at one end (e.g., a one-piece housing).

The multi-part housing electrode 110 enables the manufacturer to install the varistor stack 151 and the insulator stack assembly 160 in the cavity 125 of the base housing member 120, and thereafter install the extension housing member 130 over the stacks 150, 160 to capture the stacks 150, 160 with the flange 134.

As discussed above, in some embodiments, the combined thickness T1 of the flange 134 and the side wall 133 at the flange 134 is greater than the thickness T2 of the side wall 133 above and below the flange 134. When the arcing fail-safe 106 is activated, this added thickness at the location of the fused site 106F can eliminate or reduce the risk that the arc will melt through, perforate or weaken the side wall 133 and thereby permit the pressurized materials within the chamber 104 to break through the side wall 133 and be expelled into the environment.

The O-ring 116 between the housing parts 120, 130 provides appropriate environmental sealing.

The insulator sleeves 162, 164 of the insulator stack assembly 160 encapsulate the varistor stack 151 and provide appropriate electrical insulation between the varistor stack 151 and the side walls 123, 133 and flange 134 of the housing electrode 110. The insulator sleeves 162, 164 fix the varistor stack 151 in place in the housing assembly 111.

The insulator sleeves 162, 164 can provide adequate thermal conductivity from the lower chamber 104L. In some embodiments, the insulator sleeves 162, 164 can prevent overheating of the multiple varistor assembly during continuous TOV events wherein the varistors are stressed from high energy pulses from 1 ms-600 ms with energies from 2-300 kJ.

The insulator stack assembly 160 can improve the durability of the OVPD module 100 during handling and in service. In the case of a tall varistor stack, a single insulator sleeve extending the full length would be relatively long. A ceramic insulator sleeve of such length and having a relatively thin wall structure may be prone to break or crack in use. The use of a stack of discrete insulator sleeves 162, 164 can reduce or eliminate this risk.

The gaskets 168 serve to absorb any vibrations or shocks during operation of the OVPD module 100 to thereby protect the ceramic insulator sleeves 162, 164. The gaskets 168 serve to prevent any cracking or breaking of the ceramic insulator sleeves 162, 164 that might otherwise be caused by interactions between the insulator sleeves 162, 164 or between insulator sleeves 162, 164 and the housing parts 120, 140. In addition, the gaskets 168 provide electrical insulation between the varistor stack 151 and the lower housing electrode 110.

The barrier flange 166B can prevent emission of flame, molten metal, or glowing or flaming particles from the varistors 150 into the chambers 104M, 104U.

The external elastomeric insulating cover sleeve 176 serves to increase the insulation between the OVPD module 100 and adjacent devices and to increase the creepage and air clearance distances.

OVPD modules 100 according to some embodiments can include many MOVs connected in electrical parallel (e.g., via the interconnect members 154) and be used for low voltage applications in which there is a need to achieve high energy absorption or higher energy withstand.

In some embodiments, the OVPD module can withstand prospective current up to 13.2 kAdc for a duration up to 300 ms, which is the maximum tripping time of typical MV circuit breakers.

During use, the varistor wafers may be damaged by overheating and may generate arcing inside the OVPD housing assembly 111. The OVPD housing assembly 111 can contain the damage (e.g., debris, gases and immediate heat) within the OVPD module 100, so that the OVPD module 100 fails safely. In this way, the OVPD module 100 can prevent or reduce any damage to adjacent equipment (e.g., switch gear equipment in the cabinet) and harm to personnel. In this manner, the OVPD module 100 can enhance the safety of equipment and personnel.

According to some embodiments, the biased electrodes (e.g., the electrodes 110 and 140) apply a load to the varistors along the axis V-V in the range of from 5 kN to 100 kN depending on its surface area.

In alternative embodiments (not shown), the OVPD module 100 may be modified to use biasing or loading means such as metal spring washers and separate sealing means such as elastomeric O-rings.

In the assembled OVPD module 100, the large, planar contact surfaces of the components 144, 150, 154, 122 can ensure reliable and consistent electrical contact and connection between the components during an overvoltage or surge current event. The head 144 and the end wall 122 are mechanically loaded against these components to ensure firm and uniform engagement between the mating contact surfaces.

According to some embodiments, the combined thermal mass of the housing (e.g., the housing electrode 110) and the electrode (e.g., the electrode 140) is substantially greater than the thermal mass of each of the varistors captured therebetween. The greater the ratio between the thermal mass of the housing and electrodes and the thermal mass of the varistors, the better the varistors will be preserved during exposure to surge currents and TOV events and therefore the longer the lifetime of the OVPD. As used herein, the term "thermal mass" means the product of the specific heat of the material or materials of the object multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head and the electrode wall is substantially greater than the thermal mass of the varistor. According to some embodiments, the thermal mass of at least one of the electrode head and the electrode wall is at least two times the thermal mass of the varistor, and, according to some embodiments, at least ten times as great. According to some embodiments, the combined thermal masses of the head and the electrode wall are substantially greater than the thermal mass of the varistor, according to some embodiments at least two times the thermal mass of the varistor and, according to some embodiments, at least ten times as great.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An overvoltage protection device module comprising:
an electrically conductive first electrode;
an electrically conductive housing electrode; and
a varistor member formed of a varistor material and electrically connected between the first electrode and the housing electrode;
wherein the housing electrode includes:
a housing end wall and a housing side wall collectively defining a housing cavity; and
first and second housing members joined together at a joint, wherein the first housing member forms a first portion of the housing side wall and the second housing member forms a second portion of the housing side wall;
wherein the varistor member is disposed in the housing cavity;
wherein the overvoltage protection device module includes an integral fail-safe mechanism including an electrically conductive, meltable member; and
wherein the meltable member is responsible to heat in the overvoltage protection device module to melt and form a short circuit current flow path through the meltable member, between the first electrode and the housing electrode and bypassing the varistor member.

2. The overvoltage protection device module of claim 1 wherein:
the overvoltage protection device module has a module axis;
the first electrode, the varistor member and the end wall are axially stacked along the module axis; and
the first housing member and the second housing member are axially stacked along the module axis.

3. The overvoltage protection device module of claim 1 wherein:
the first housing member is a base housing member including the end wall and an integral base side wall; and
the base housing member defines a base cavity forming a part of the housing cavity.

4. The overvoltage protection device module of claim 3 wherein the varistor member is disposed in the base cavity.

5. The overvoltage protection device module of claim 3 wherein the second housing member is an extension housing member defining a passage, and the passage forms a part of the housing cavity.

6. The overvoltage protection device module of claim 3 wherein:
the base housing member is unitarily formed of metal; and
the extension housing member is unitarily formed of metal.

7. The overvoltage protection device module of claim 1 wherein:
the first housing member includes a first screw thread;
the second housing member includes a second screw thread; and
the first and second housing members are joined together at the joint by the first and second screw threads.

8. The overvoltage protection device module of claim 1 including an annular sealing member interposed between the first and second housing members to seal the joint.

9. The overvoltage protection device module of claim 1 wherein:
the first housing member includes a first contact surface;
the second housing member includes a second contact surface; and
the first and second contact surfaces engage one another at the joint to provide electrical continuity between the first and second housing members.

10. The overvoltage protection device module of claim 1 wherein the first electrode is disposed in the housing cavity.

11. The overvoltage protection device module of claim 1 wherein:
the overvoltage protection device module has a module axis;
the overvoltage protection device module includes a varistor stack including a stack of varistor members formed of a varistor material;
the varistor stack is electrically connected between the first electrode and the housing electrode;
the varistor stack is disposed in the housing cavity between the first electrode and the end wall; and
the first electrode, the varistor stack and the end wall are axially stacked along the module axis.

12. The overvoltage protection device module of claim 11 including at least one electrically conductive interconnect member connecting at least two of the varistor members in electrical parallel between the first electrode and the housing electrode.

13. The overvoltage protection device module of claim 12 wherein:
the overvoltage protection device module includes an insulator member surrounding at least a portion of the varistor stack;
the insulator member is formed of an electrically insulating material;
the insulator member includes a receiver recess; and
a portion of the interconnect member extends outwardly beyond the plurality of varistors and is disposed in the receiver recess.

14. The overvoltage protection device module of claim 1 wherein:
the overvoltage protection device module has a module axis;
the overvoltage protection device module includes an insulator stack assembly comprising a plurality of tubular insulator members that are axially stacked along the module axis;
the insulator stack assembly is disposed in the housing cavity;
the insulator stack assembly surrounds the varistor member between the varistor member and the housing electrode; and
the insulator members are formed of an electrically insulating material.

15. The overvoltage protection device module of claim 14 wherein the insulator stack assembly includes at least one gasket axially interposed between adjacent ones of the insulator members.

16. The overvoltage protection device module of claim 14 wherein the insulator members are formed of ceramic.

17. The overvoltage protection device module of claim 1 including a loading device applying an axially compressive load to the varistor member.

18. The overvoltage protection device module of claim 17 wherein the loading device includes an elastomeric compression member electrically insulating the first electrode from the housing electrode and biasing the first electrode and the housing electrode to apply a compressive load on the varistor member.

19. The overvoltage protection device module of claim 1 including an integral fail-safe mechanism operative to electrically short circuit the first electrode and the housing electrode about the varistor member by fusing first and second metal surfaces in the overvoltage protection device module to one another using an electric arc.

20. The overvoltage protection device module of claim 19 wherein:
the housing electrode includes a flange that projects radially inward from the housing side wall;
the first metal surface is a surface of the first electrode; and
the second metal surface is a surface of the flange.

21. The overvoltage protection device module of claim 1 including an electrically insulating, elastomeric insulating cover sleeve surrounding the first and second housing members.

22. An overvoltage protection device module having a module axis and comprising:
an electrically conductive first electrode;
an electrically conductive housing electrode defining a housing cavity; and
a varistor member formed of a varistor material and electrically connected between the first electrode and the housing electrode;
wherein:
the housing electrode includes:
a side wall; and
a flange that projects radially inward from the side wall; and
the overvoltage protection device module includes an integral fail-safe mechanism operative to electrically short circuit the first electrode and the housing electrode about the varistor member by fusing a surface of the first electrode to a surface of the flange using an electric arc.

23. The overvoltage protection device module of claim 15 wherein the at least one gasket is/are formed of an elastomeric material.

24. An overvoltage protection device module comprising:
an electrically conductive first electrode;
an electrically conductive housing electrode; and
a varistor member formed of a varistor material and electrically connected between the first electrode and the housing electrode;
wherein the housing electrode includes:
a housing end wall and a housing side wall collectively defining a housing cavity; and
first and second housing members joined together at a joint, wherein the first housing member forms a first portion of the housing side wall and the second housing member forms a second portion of the housing side wall;

wherein the varistor member is disposed in the housing cavity; and wherein:
- the first housing member includes a first contact surface;
- the second housing member includes a second contact surface; and
- the first and second contact surfaces engage one another at the joint to provide electrical continuity between the first and second housing members.

25. An overvoltage protection device module comprising:
an electrically conductive first electrode;
an electrically conductive housing electrode; and
a varistor member formed of a varistor material and electrically connected between the first electrode and the housing electrode;

wherein the housing electrode includes:
- a housing end wall and a housing side wall collectively defining a housing cavity; and
- first and second housing members joined together at a joint, wherein the first housing member forms a first portion of the housing side wall and the second housing member forms a second portion of the housing side wall;

wherein the varistor member is disposed in the housing cavity;

wherein:
- the overvoltage protection device module has a module axis;
- the overvoltage protection device module includes a varistor stack including a stack of varistor members formed of a varistor material;
- the varistor stack is electrically connected between the first electrode and the housing electrode;
- the varistor stack is disposed in the housing cavity between the first electrode and the end wall;
- the first electrode, the varistor stack and the end wall are axially stacked along the module axis; and
- the overvoltage protection device module includes at least one electrically conductive interconnect member connecting at least two of the varistor members in electrical parallel between the first electrode and the housing electrode.

26. The overvoltage protection device module of claim 25 wherein:
- the overvoltage protection device module includes an insulator member surrounding at least a portion of the varistor stack;
- the insulator member is formed of an electrically insulating material;
- the insulator member includes a receiver recess; and
- a portion of the interconnect member extends outwardly beyond the plurality of varistors and is disposed in the receiver recess.

27. An overvoltage protection device module comprising:
an electrically conductive first electrode;
an electrically conductive housing electrode; and
a varistor member formed of a varistor material and electrically connected between the first electrode and the housing electrode;

wherein the housing electrode includes:
- a housing end wall and a housing side wall collectively defining a housing cavity; and
- first and second housing members joined together at a joint, wherein the first housing member forms a first portion of the housing side wall and the second housing member forms a second portion of the housing side wall;

wherein the varistor member is disposed in the housing cavity; and wherein the overvoltage protection device module includes an integral fail-safe mechanism operative to electrically short circuit the first electrode and the housing electrode about the varistor member by fusing first and second metal surfaces in the overvoltage protection device module to one another using an electric arc.

28. The overvoltage protection device module of claim 27 wherein:
- the housing electrode includes a flange that projects radially inward from the housing side wall;
- the first metal surface is a surface of the first electrode; and
- the second metal surface is a surface of the flange.

* * * * *